(12) United States Patent
Tilton

(10) Patent No.: US 8,177,066 B2
(45) Date of Patent: May 15, 2012

(54) PRINTED PACKAGING

(75) Inventor: Christopher R. Tilton, Laguna Hills, CA (US)

(73) Assignee: One Source Industries, LLC, Irvine, CA (US)

( * ) Notice: Subject to any disclaimer, the term of this patent is extended or adjusted under 35 U.S.C. 154(b) by 0 days.

(21) Appl. No.: 12/903,156

(22) Filed: Oct. 12, 2010

(65) Prior Publication Data

US 2011/0024321 A1  Feb. 3, 2011

Related U.S. Application Data

(63) Continuation of application No. 12/028,754, filed on Feb. 8, 2008, now abandoned.

(60) Provisional application No. 60/888,939, filed on Feb. 8, 2007.

(51) Int. Cl.
*B65D 73/00* (2006.01)
(52) U.S. Cl. ...................................................... 206/462
(58) Field of Classification Search .................. 206/469, 206/471, 461, 462
See application file for complete search history.

(56) References Cited

U.S. PATENT DOCUMENTS

| | | |
|---|---|---|
| 2,767,711 A | 10/1956 | Ernst |
| 2,811,106 A | 10/1957 | Picarello |
| 2,958,172 A | 11/1960 | Branche |
| 3,067,039 A | 12/1962 | Crane |
| 3,075,330 A | 1/1963 | Swezey |
| 3,161,288 A | 12/1964 | Wagner |
| 3,173,540 A | 3/1965 | Lapides |
| 3,231,645 A | 1/1966 | Bolomey |
| 3,246,747 A | 4/1966 | Blish |
| 3,289,830 A | 12/1966 | Foote |
| 3,298,515 A | 1/1967 | Watts, Jr. |
| 3,498,018 A | 3/1970 | Seiferth et al. |
| 3,554,367 A | 1/1971 | Hoover |
| 3,856,144 A * | 12/1974 | Kelly ............................. 206/462 |
| 3,912,823 A | 10/1975 | Kane |
| 3,979,016 A | 9/1976 | Frater |
| 4,082,877 A | 4/1978 | Shadle |
| 4,083,137 A | 4/1978 | Rozmanith |
| 4,083,451 A | 4/1978 | Hair |
| 4,091,927 A | 5/1978 | Lunsford |
| 4,210,246 A | 7/1980 | Kuchenbecker |

(Continued)

FOREIGN PATENT DOCUMENTS

DE    2 224 924    12/1973

(Continued)

OTHER PUBLICATIONS

3M Product Packaging Pictures; 6 pictures on 6 pages.

(Continued)

*Primary Examiner* — J. Gregory Pickett
*Assistant Examiner* — Andrew Perreault
(74) *Attorney, Agent, or Firm* — Knobbe, Martens, Olson & Bear LLP

(57) ABSTRACT

High visual impact plastic packaging is described as well as methods for producing such packaging. Sealing portions of a package to each other in an interwoven manner is described. Printing on multiple surfaces of a package to obtain appealing visual effects is described. Methods of sealing plastic packages are described, including some that use heat sealing techniques. Plasticized or laminated paperboard materials can be used, as well as plastic materials such as mineral-based materials, polylactic acid, and recycled and/or recyclable polyurethane.

32 Claims, 18 Drawing Sheets

U.S. PATENT DOCUMENTS

| | | |
|---|---|---|
| 4,236,636 A | 12/1980 | Kuchenbecker |
| 4,261,462 A | 4/1981 | Wysocki |
| 4,266,666 A | 5/1981 | Kuchenbecker |
| 4,291,807 A | 9/1981 | Giordano et al. |
| 4,300,682 A | 11/1981 | Kuchenbecker |
| 4,307,804 A | 12/1981 | Benham |
| 4,466,534 A | 8/1984 | Dunn |
| 4,574,951 A | 3/1986 | Weaver |
| 4,606,460 A | 8/1986 | Luray |
| 4,623,062 A | 11/1986 | Chase et al. |
| 4,718,547 A | 1/1988 | MacTavish |
| 4,771,888 A | 9/1988 | Lundeen |
| 4,779,734 A | 10/1988 | Kydonieus |
| 4,801,296 A | 1/1989 | Vaillancourt |
| 4,840,275 A | 6/1989 | Faiola et al. |
| 4,848,541 A | 7/1989 | Paliotta et al. |
| 4,981,213 A | 1/1991 | Dillon |
| 5,078,817 A | 1/1992 | Takagaki |
| 5,143,218 A | 9/1992 | Brauckmann |
| 5,154,293 A | 10/1992 | Gould |
| 5,169,470 A | 12/1992 | Goldberg |
| 5,188,222 A | 2/1993 | Pierce |
| 5,323,907 A * | 6/1994 | Kalvelage .................... 206/531 |
| 5,344,662 A * | 9/1994 | Payne et al. .................... 426/124 |
| D353,092 S | 12/1994 | Green |
| 5,376,424 A | 12/1994 | Watanabe |
| 5,405,000 A | 4/1995 | Hagedon et al. |
| 5,452,802 A | 9/1995 | Green |
| 5,486,390 A | 1/1996 | Burns et al. |
| 5,579,288 A | 11/1996 | Malloy et al. |
| 5,699,913 A | 12/1997 | Richardson |
| 5,762,200 A | 6/1998 | Goudreau |
| 5,802,890 A | 9/1998 | Espada-Velasco |
| 5,803,260 A | 9/1998 | Tilton |
| 5,830,548 A * | 11/1998 | Andersen et al. ............ 428/36.4 |
| 5,843,544 A * | 12/1998 | Andersen et al. ............ 428/36.5 |
| 5,863,414 A | 1/1999 | Tilton |
| 5,908,208 A | 6/1999 | Lapsker |
| 5,927,495 A | 7/1999 | Didiano |
| D412,631 S | 8/1999 | Green |
| 5,944,173 A | 8/1999 | Boire et al. |
| 5,979,662 A | 11/1999 | Green |
| 5,984,091 A | 11/1999 | Orr et al. |
| 5,984,099 A | 11/1999 | Shimizu et al. |
| 6,016,913 A | 1/2000 | Tilton |
| 6,050,420 A | 4/2000 | Green |
| 6,053,320 A | 4/2000 | Kuethe |
| 6,053,321 A | 4/2000 | Kayser |
| 6,083,586 A * | 7/2000 | Andersen et al. ............ 428/36.4 |
| 6,152,305 A | 11/2000 | Green |
| 6,308,832 B1 | 10/2001 | Pirro et al. |
| 6,345,716 B1 | 2/2002 | Chapman |
| 6,361,847 B1 | 3/2002 | Magnusson et al. |
| 6,364,113 B1 | 4/2002 | Faasse et al. |
| 6,367,632 B1 | 4/2002 | Green |
| 6,401,926 B1 | 6/2002 | Lo |
| 6,427,842 B1 | 8/2002 | Green |
| D463,273 S | 9/2002 | Green |
| D463,274 S | 9/2002 | Green |
| D463,741 S | 10/2002 | Green |
| 6,571,953 B2 | 6/2003 | Sherline et al. |
| 6,691,870 B1 | 2/2004 | Palm et al. |
| 6,889,839 B1 | 5/2005 | Rosten et al. |
| 6,905,075 B1 | 6/2005 | Rosen |
| 7,051,876 B2 | 5/2006 | Grosskopf |
| 7,144,635 B2 | 12/2006 | Hawes et al. |
| 7,316,318 B1 | 1/2008 | Rosten et al. |
| 7,571,810 B2 | 8/2009 | Tilton |
| 7,681,733 B2 * | 3/2010 | Grosskopf .................... 206/462 |
| 7,832,560 B2 | 11/2010 | Tilton |
| 2002/0050119 A1 | 5/2002 | Gatewood et al. |
| 2002/0153278 A1 | 10/2002 | Pirro |
| 2002/0189964 A1 | 12/2002 | Mazurek |
| 2003/0052033 A1 | 3/2003 | Schwester |
| 2003/0077470 A1 | 4/2003 | Sammarco et al. |
| 2003/0217949 A1 | 11/2003 | Schamante |
| 2004/0040880 A1 | 3/2004 | Grosskopf |
| 2004/0045859 A1 | 3/2004 | Favale |
| 2005/0103680 A1 | 5/2005 | Nakatsu et al. |
| 2005/0269232 A1 | 12/2005 | Eisenbraun |
| 2006/0006090 A1 | 1/2006 | Charng |
| 2006/0151350 A1 | 7/2006 | Tilton |
| 2006/0201843 A1 | 9/2006 | Keller |
| 2006/0231447 A1 | 10/2006 | Fensham |
| 2007/0051653 A1 | 3/2007 | Tilton |
| 2007/0125678 A1 | 6/2007 | Green |
| 2007/0187273 A1 | 8/2007 | Grosskopf |
| 2007/0209957 A1 | 9/2007 | Glenn et al. |
| 2009/0038977 A1 | 2/2009 | Tilton |
| 2010/0025278 A1 | 2/2010 | Tilton |

FOREIGN PATENT DOCUMENTS

| | | |
|---|---|---|
| DE | 2611786 C2 | 11/1982 |
| DE | 32 23 732 A1 | 12/1983 |
| DE | 9315244 U1 | 12/1993 |
| DE | 200 03 802 U1 | 5/2000 |
| DE | 19931364 A1 | 1/2001 |
| EP | 0468864 A1 | 7/1990 |
| EP | 0468864 B1 | 9/1995 |
| EP | 0968930 A | 1/2000 |
| FR | 2 698 618 A | 6/1994 |
| FR | 2 737 197 | 1/1997 |
| GB | 2058724 A | 4/1981 |
| GB | 2 188 035 | 9/1987 |
| JP | 11 11674 | 4/1989 |
| JP | 4211981 | 8/1992 |
| JP | 2308321 | 10/2002 |
| JP | 4291565 | 10/2004 |
| WO | WO 97/12761 A1 | 4/1997 |
| WO | WO 97/27053 A1 | 7/1997 |
| WO | WO 98/36915 A1 | 8/1998 |
| WO | WO 98/51437 A1 | 11/1998 |
| WO | WO 98/51491 A1 | 11/1998 |
| WO | WO 98/51492 A1 | 11/1998 |
| WO | WO 98/51493 A1 | 11/1998 |
| WO | WO 0046122 A | 8/2000 |
| WO | WO 01/08894 A1 | 2/2001 |
| WO | WO 0238470 A1 | 5/2002 |
| WO | WO 02/090207 A1 | 11/2002 |
| WO | WO 2004/028820 A1 | 4/2004 |
| WO | WO 2006/076448 A1 | 7/2006 |
| WO | WO 2007/030561 A1 | 3/2007 |
| WO | WO 2008/009822 A1 | 8/2008 |

OTHER PUBLICATIONS

International Search Report for PCT Application No. PCT/US2006/034752 mailed Jan. 19, 2007.

International Search Report for PCT Application No. PCT/US2006/001009 mailed Oct. 5, 2006.

International Search Report for PCT Application No. PCT/US2008/053509 mailed Jun. 13, 2008.

* cited by examiner

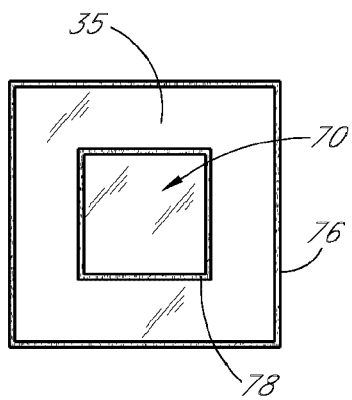
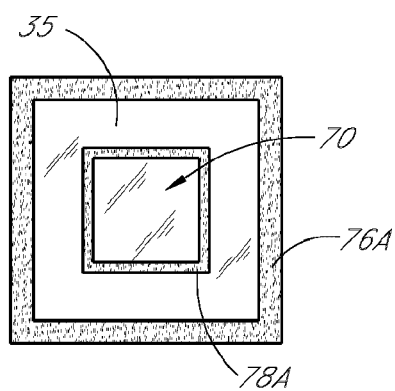
FIG. 7   FIG. 7A
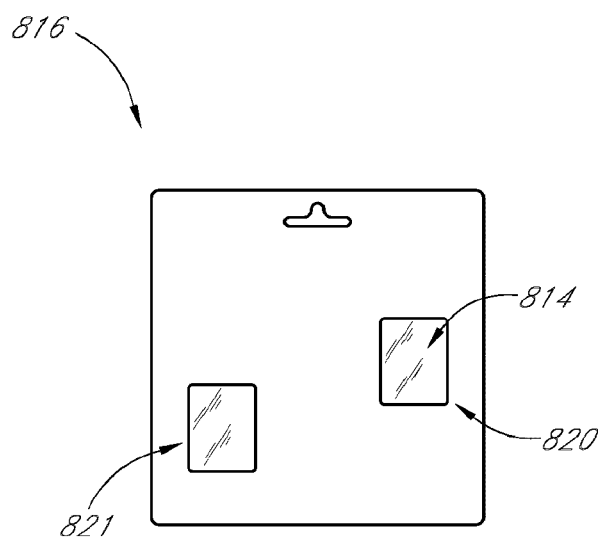
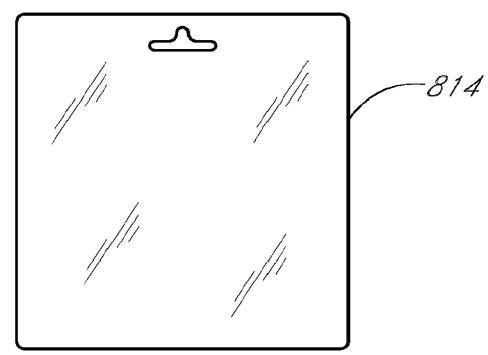
FIG. 8   FIG. 9

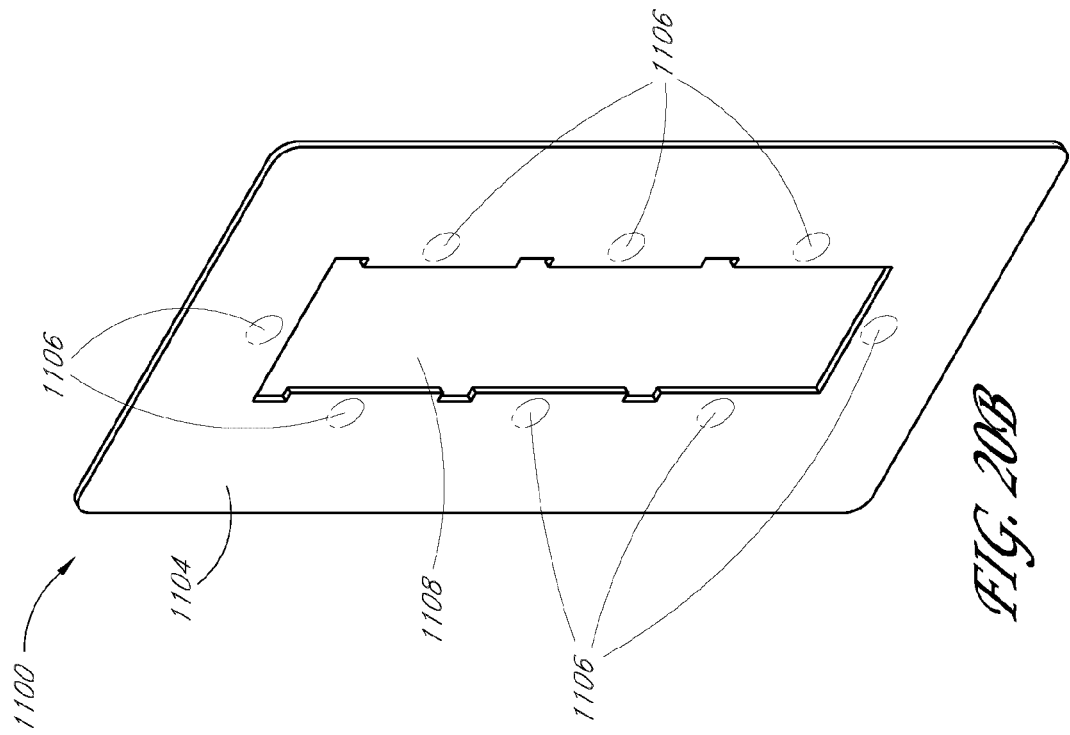
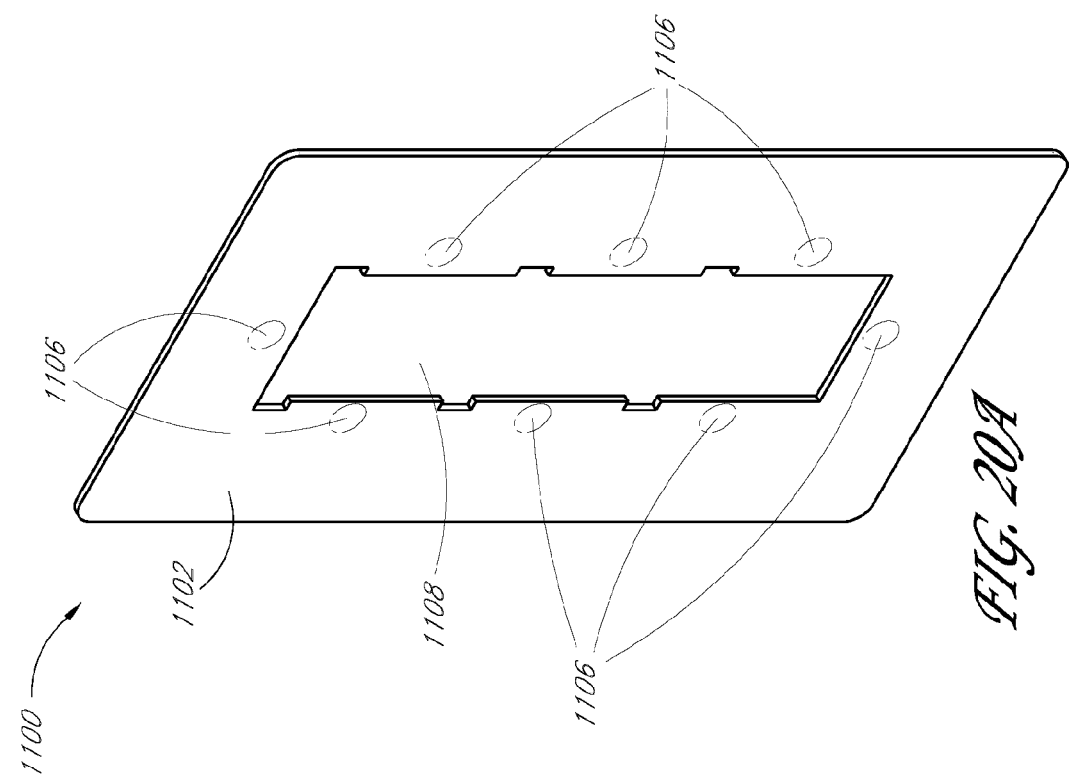

PRINTED PACKAGING

REFERENCE TO RELATED APPLICATIONS

This application is a continuation of co-pending U.S. patent application Ser. No. 12/028,754, filed Feb. 8, 2008, which claims priority to U.S. Provisional Patent Application No. 60/888,939, filed Feb. 8, 2007, the entire disclosure of each of which is hereby incorporated by reference herein and made part of this specification.

BACKGROUND

1. Field

Invention embodiments disclosed herein relate to product packaging. More specifically, some embodiments provide for a retail product display package that is not only highly attractive, but also efficient to manufacture.

2. Background

Manufacturers and retailers commonly attempt to make their products more attractive to customers by using packaging. However, some of the packages that attract buyers are expensive to manufacture. Often, less expensive packaging looks unprofessional and sometimes unsightly. Furthermore, many inexpensive packages are not theft-resistant and can be easily torn or otherwise opened by potential thieves in a retail store. For example, blister packs are not sufficiently secure, due to readily-torn cardboard portions. Clamshell packaging can be more tamper-resistant than blister packs, but in current forms, it has drawbacks as well, because generally a cardboard insert must be separately printed and then positioned within the packaging by human hands. Indeed, many of the complex folds and features employed to make clamshell packaging more tamper resistant make such packaging expensive to manufacture. For example, the thick plastic often used is relatively expensive, and assembly steps are difficult to automate. Furthermore, many of the packaging genres described above do not make use of recycled materials, leading to increased manufacturing costs. Additionally, some plastic packaging is exposed to heat during transport and storage prior to display for sale, or in display locations. Some packaging is susceptible to heat, which can cause portions of the packaging to curl, deforming the aesthetic appearance of the packaging.

Therefore, a package that is capable of displaying informative product information, can be cheaply manufactured, is relatively rugged, and can comprise a highly attractive design would be of great benefit to the retail sales industry.

SUMMARY

Invention embodiments described herein have several features, no single one of which is solely responsible for their desirable attributes. Without limiting the scope of the invention as expressed by the claims that follow, some of the prominent features will now be discussed briefly. Embodiments disclosed in this application provide for packaging that solves many of the problems encountered in the past. For example, some embodiments are inexpensive to manufacture and highly attractive. Furthermore, some embodiments provide high impact point-of-sale marketing. Various materials can be used in accordance with the disclosed embodiments, including recycled and virgin plastics or mineral-based material or bio-based material. The disclosed inventions provide for superior quality and environmentally favorable packaging with unique visual appeal.

One method of manufacturing a package, the method can comprise providing a first substantially flat portion having an opening, providing a blister portion having a protruding blister and a substantially flat flange with at least one hole, providing a second substantially flat portion, extending the protruding blister through the opening of the first substantially flat portion, and sealing the second substantially flat portion to the first substantially flat portion through the at least one hole. In some instances, providing a first substantially flat portion having an opening and providing a second substantially flat portion can further comprise providing first and second substantially flat portions that both extend beyond the substantially flat flange in at least one dimension, and the method further can comprise sealing the second substantially flat portion to the first substantially flat portion at the portions that extend beyond the substantially flat flange. In some instances, sealing the second substantially flat portion to the first substantially flat portion at the portions that extends beyond the substantially flat flange can further comprise creating a seal that extends substantially around the periphery of the first and second substantially flat portions.

Another method of interweaving portions of a blister package through sealing can comprise providing a front package portion, providing a back package portion, providing a blister package portion having a hole, sealing the back package portion directly to the blister package portion, and sealing the back package portion directly to the front package portion through the hole in the blister package portion. Some methods can further comprise providing a pattern of multiple holes in the blister package and sealing the back package portion directly to the front package portion through the pattern of multiple holes.

Some embodiments can include a first flat portion having printing thereon and a plurality of regions of increased stiffness, a second flat portion having printing thereon and an opening therein, a central portion with a peripheral region positioned between the first and second flat portions and a cavity portion protruding from either the first flat portion or the second flat portion. The first flat portion and the second flat portion can be secured together to secure the peripheral region of the central portion in place. In some embodiments, at least one of the first and second flat portions is composed of a mineral-based material, such as a material composed of limestone. In some embodiments, at least one of the first and second flat portions is composed of a polylactic acid. In some embodiments, the central portion has a plurality of holes. In some embodiments, the first and second flat portions are secured by contact made between the first and second flat portions through at least one of the plurality of holes. In some embodiments, the first and second flat portions are secured through the use of an adhesive. In other embodiments, the first and second flat portions are secured through heat-sealing. In some embodiments, the holes are regularly spaced around the periphery. In some embodiments, the regions comprise compacted portions of the first flat portion. In some embodiments, the regions have an irregular geometric shape. In other embodiments, the regions have a quadrilateral shape. In yet other embodiments, the regions have a longer dimension in a first direction than in a second direction, where the second direction is transverse to the first direction.

In some embodiments, a printed package comprising a first portion formed from polylactic acid having printing thereon, a second portion having printing thereon and an opening therein, and a central portion with a peripheral region positioned between the first and second portions and a cavity portion protruding from either the first portion or the second portion, wherein the first portion and the second portion being secured together to secure the peripheral region of the central portion in place. In some embodiments, the second portion is also formed from polylactic acid. In other embodiments, the second portion is formed from a mineral-based material. In some embodiments, the central portion is formed from polylactic acid. In some embodiments, the central portion comprises preformed rigid or semi-rigid plastic. In some embodiments, the central portion is transparent. In some embodiments, the first portion is larger than the second portion. In some embodiments, the first portion comprises a separable portion. In some embodiments, the second portion is larger than the first portion. In some embodiments, the second portion is at least partially transparent plastic and has at least partially translucent printing thereon. In some embodiments, the package further comprises a heat-activated adhesive layer that is approximately coextensive with the surface area of the second flat portion. In some embodiments, the second portion is at least partially transparent plastic and has printing configured to obscure underlying adhesive. In some embodiments, the first and second flat portions have four surfaces with printing on at least three of those surfaces. In some embodiments, printing on at least two surfaces comprises multiple overlying patterns, where underlying patterns are at least partially visible through overlying layers. In some embodiments, the printing comprises inks of multiple colors. In some embodiments, the printing comprises iridescent materials.

In some embodiments, the printed package comprises a first portion formed from a mineral-based material having printing thereon, a second portion having printing thereon and an opening therein, and a central portion with a peripheral region positioned between the first and second portions and a cavity portion protruding from either the first portion or the second portion, the first portion and the second portion being secured together to secure the peripheral region of the central portion in place. In some embodiments, the second portion is also formed from a mineral-based material. In some embodiments, the mineral is limestone. In some embodiments, the second portion is formed from polylactic acid. In some embodiments, the central portion is formed from polylactic acid.

BRIEF DESCRIPTION OF THE DRAWINGS

Preferred embodiments will now be discussed in detail. The embodiments depict novel and non-obvious aspects of printed packaging that has great advantages over the prior art. The embodiments shown in the drawings are for illustrative purposes only, and the claimed inventions should not be deemed limited by the exemplary embodiments illustrated by the following figures:

FIG. 7 shows a packaging portion with thin, continuous lines of adhesive.

FIG. 7A shows a packaging portion with thicker, continuous lines of adhesive.

FIG. 8 shows components of a packaging having multiple windows.

FIG. 9 shows a view of the opposite side of the components of FIG. 8.

FIG. 20A illustrates a front perspective view of the front panel of the plastic package of FIG. 19.

FIG. 20B illustrates a rear perspective view of the front panel illustrated in FIG. 20A.

DETAILED DESCRIPTION OF THE PREFERRED EMBODIMENTS

Product information printed directly on a product's packaging enhances convenience for potential buyers. A buyer can study the package at the point of sale and compare various products according to the data printed on the package. This can save time for a consumer and provide access to useful information, reducing the risk that the product will later be returned or that the consumer will not be happy with the purchase. Furthermore, such information on packaging increases the chances that a customer will buy the product by informing him or her of its novel features and advantages. Information provided on product packaging can also have a persuasive role from a purely advertising perspective by conveying a positive brand message and encouraging purchase through enumerating the merits and utility of the product.

Providing product data to the shopper is not the only reason to print directly on product packaging; the packaging can in fact attract buyers that would otherwise not be interested in the product. For example, the packaging may prominently display a trademark or brand name that does not or cannot appear so prominently on the product itself. A package may further display colors that are more eye-catching than would be desirable for the product itself. Furthermore, a product package can serve the purpose of calling attention to the product or group of products, drawing the consumer closer to the product or products. Indeed, product packaging can be part of an overall visual effect caused by a display in a retail location. For example, the product packaging can have colors that harmonize or clash with display colors to create a visual effect. Such attractive packaging and/or brightly colored advertising increases the product's visibility on the shelf.

Another way a product packaging can add value is by associating a product with an entity from popular culture such as a movie personality or a broader advertising campaign. This can be accomplished by portraying commonly recognized images or words on the packaging. A product's packaging can thus capitalize on the popularity or status of any entity or fad. Recognizing the multiple ways product packaging can be used in a retail setting, various improvements can further enhance current packages and the methods and systems that lead to their creation and use.

Product packaging can be especially effective when it features the actual product, set off by the product packaging. For example, a product can be seen through the packaging, thus allowing the potential buyer to know exactly what the package contains.

Figure 1:
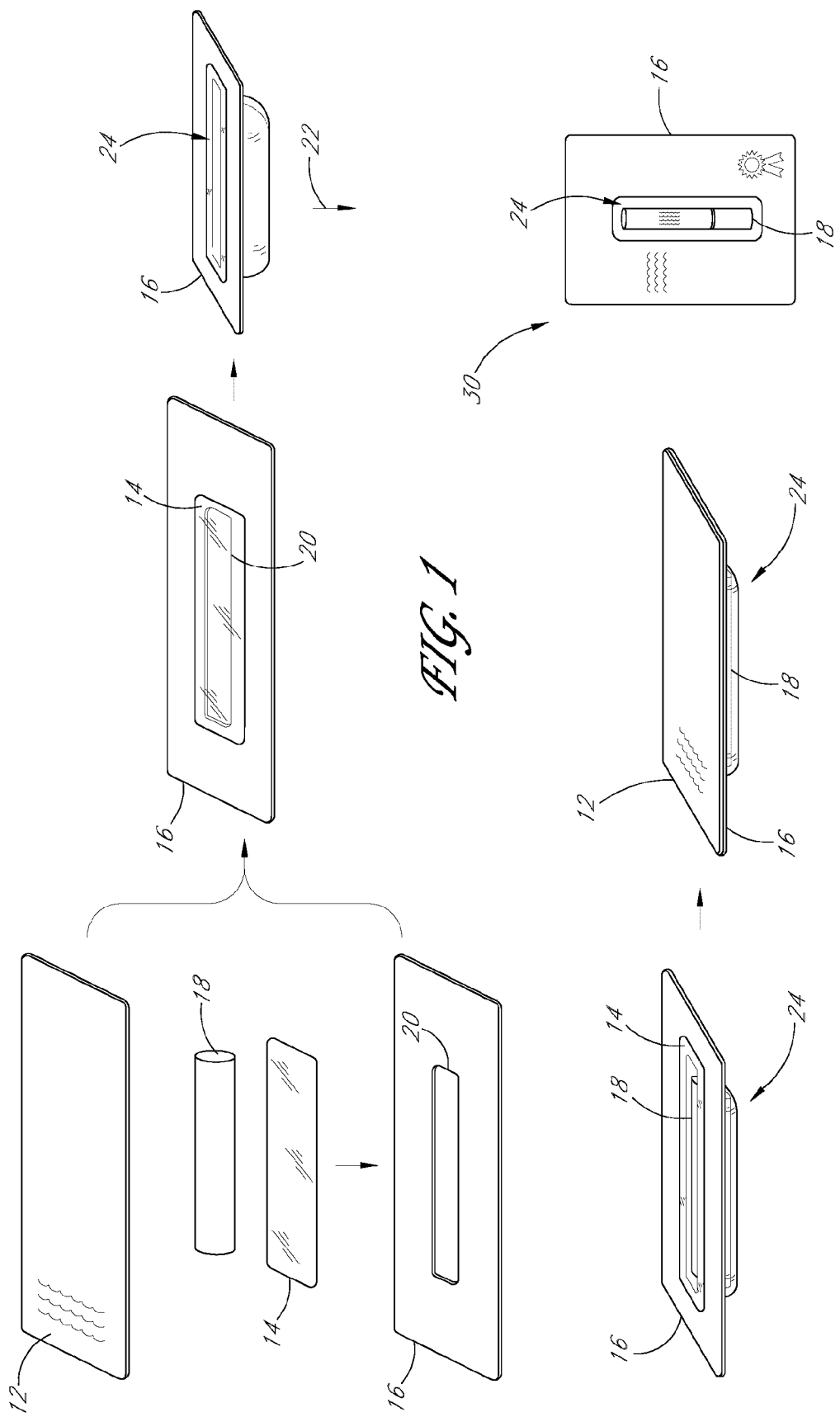
FIG. 1 schematically illustrates package components and a process that can be used to assemble them into a plastic package.

FIG. 1 illustrates components that can be used to construct a plastic package containing a product. For example, a first portion 12, a center film 14, and a second portion 16 can be used to enclose a product 18. The center film 14 can first be positioned over an opening 20 in the second portion 16. One step in the manufacturing process can comprise cutting or punching the opening 20 (or multiple such openings) in the desired shape(s). The center film 14 can be adhered to the second portion 16 so that the center film 14 closes the opening 20 and overlaps the edges of the opening 20. (This adhesion can be achieved on a temporary basis and the center film 14 can later be more securely adhered.) The center film 14 can then be urged (by a vacuum, for example) to stretch and protrude out through the opening 20 in the direction of the arrow 22. The product 18 can be placed within the cavity 24 formed by the bulging center film 14. The cavity 24 can be reduced in size to conform more precisely to the shape of the product 18, and the first portion 12 can be secured to the second portion 16, enclosing the product 18 within the cavity 24 and further securing the center film 14 in place within or adjacent to the opening 20. One or more surfaces of each of the first portion 12 and the second portion 16 can be printed before or after the above-described process, and the center film 14 can be transparent. Thus, this process can result in a package 30 that attractively encloses the product 18, which can be seen through the center film 14 while the product 18 is in the cavity 24.

In some embodiments, the cavity 24 is reduced in size after the product 18 is placed within the cavity 24. For example, the film 14 can be heated in order to shrink and conform tightly to the contours of the product 18. If the film 14 is transparent, this can give the impression that the product is floating freely next to the package, which can allow a consumer to examine the product and can make the packaging unobtrusive. Thus, the consumer can't clearly see the film which tightly (and almost invisibly) surrounds the product. This process can be similar to a shrink-wrap process.

Materials

In some embodiments, the first portion 12 and/or second portion 16 are formed from paperboard cards that are coated or laminated with plastic or other materials (e.g., at the paper mill). This coating can provide enhanced theft-prevention and strength, as well as the cosmetic (e.g., glossy) effects and sealing advantages discussed further below. In some embodiments, the first portion 12 and/or second portion 16 can be interlaced with plastic reinforced webbing (e.g., nylon webbing), random particles, or other material fragments during the corrugation or mill production process. These techniques can improve tear resistance or puncture resistance and improve strength and theft resistance.

Figure 4:
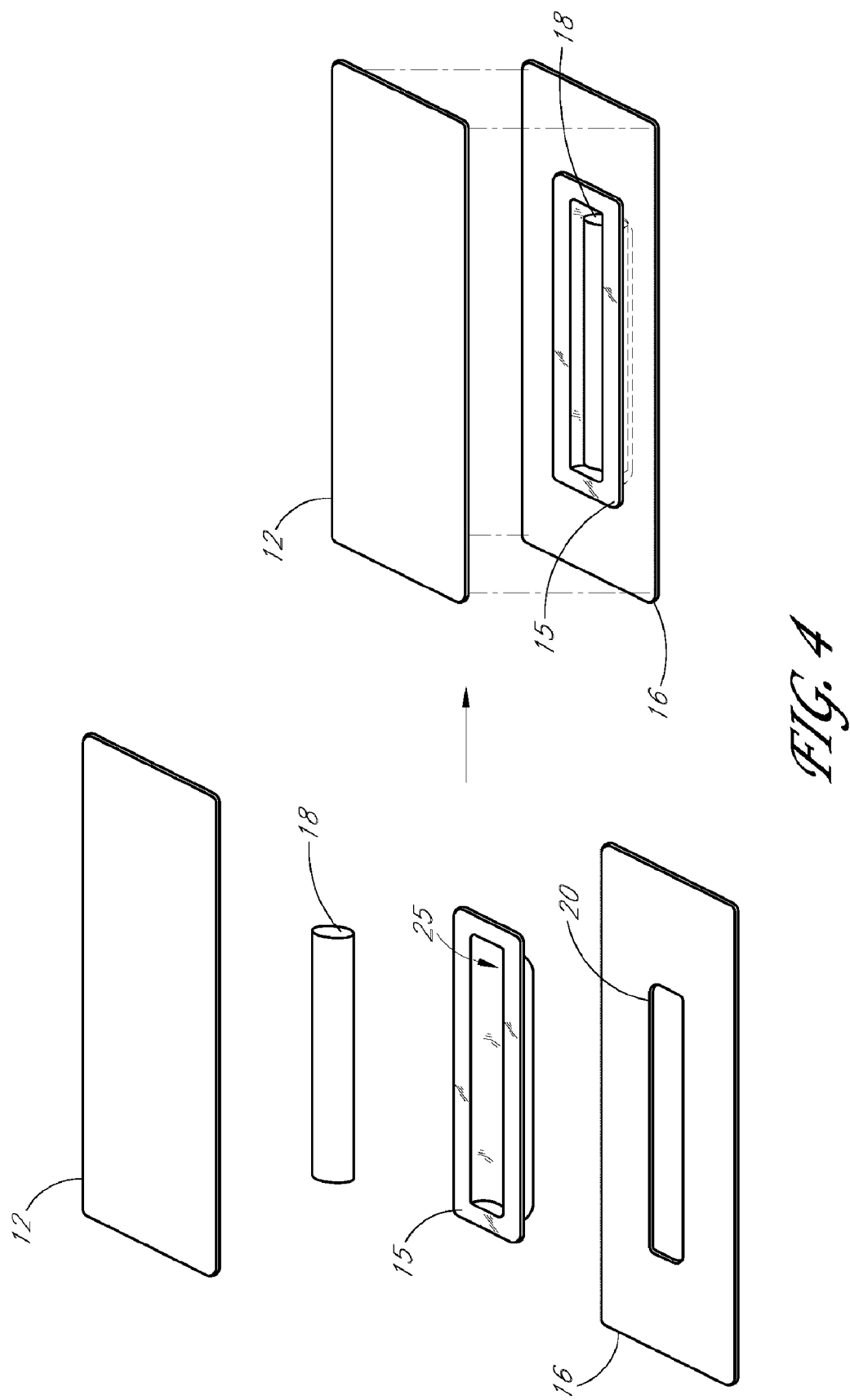
FIG. 4 schematically illustrates package components and a process that can be used to assemble them into a plastic package.

Clear plastic can be used for at least a portion of the packaging that is used to enclose and display products (such as the central film portion 14 or the pre-formed portion 15 of FIG. 4, for example). This allows consumers to see the product inside. Clear plastic can also be used to permit the consumer to see through the plastic material to a printed insert or printed backing. Transparent, translucent, or partially transparent plastic can be used to form any of the various portions illustrated in FIG. 1, including the first portion 12, the second portion 16, and the central film portion 14. Preferably, the central film portion 14 is formed from transparent plastic so the product 18 can be seen through it. In some embodiments, the first portion 12 is the front of the package so the product 18 is located in a recessed cavity 24. In this case, at least a portion of the first portion 12 is advantageously transparent to reveal the product 18 through the front of the package. In some embodiments, the second portion 16 is the front of the package.

Whether the various portions are transparent or not, however, it is desirable to be able to print on those portions, even if they are formed from plastic or plasticized paperboard. Printing directly on plastic, clear or otherwise, has many advantages. Such an approach can avoid extra costs associated with extra inserts, for example. Furthermore, printing on clear plastic allows for a wide array of impressive visual effects. Plastic materials that can be used for these purposes include thermoplastic materials. Preferred embodiments are formed from plastic materials that resist tearing, puncturing, and/or ripping. Preferred materials include polyvinyl chloride (PVC), polyethylene (PET), recycled PET, recycled PVC, polypropylene, PVC styrene, APET, recyclable PET, recyclable PVC, and other materials having similar tamper-resistant properties. Preferred materials also include those materials that can be sealed using RF, sonic, heat, or ultraviolet sealing technology. Various embodiments are formed from a wide variety of virgin, recycled, or recyclable materials, providing a unique appearance that is both superior in quality and environmentally favorable. The plastic material can be completely transparent, partially transparent, or fully impervious to light. Varying levels of opacity can be accomplished by printing ink layers on the surfaces of the plastic material or by including opaque materials in the mixture of chemicals that is used to form the original plastic material, for example. A plastic package can comprise a transparent cover and a non-transparent backing, or a transparent backing and a non-transparent cover. Various other combinations of transparency and/or opacity are also possible.

In some embodiments, some or all of the portions of the package described as "plastic" can be formed from a mineral-based material. For example, one material that can be used to form non-transparent portions of a package, including without limitation, the front or back portions, is "ViaStone" or "NatureStone." Mineral-based materials can be made with natural stone, such as limestone, although other minerals can also be used. Mineral-based materials can also be made with inorganic mineral powder and can have reduced resin content. These materials often require less bleaching than many tree-based paper products. The production of ViaStone, for example, is generally tree-free and often does not require water or toxic agents. Other stone-based papers can include Terraskin, Xterrane, and Ultragreen. In some embodiments, limestone-based papers can be referred to generically as "limestone mineral paper," or "LMP." Mineral-based materials can be advantageous in that they are, in some ways, even less ecologically harmful than renewable paper products.

Additionally, polylactic acid (PLA) or other bio-based products can be used to form one or more of the package portions. In some embodiments, a preferred material is PLA. PLA is a polymer derived from natural plant sugars and marketed as NatureWorks PLA or Ingeo fibers. PLA can be obtained from Cargill, Inc. and NatureWorks, LLC. In some embodiments, PLA is a polylactide polymer that can be derived completely or nearly completely from annually renewable resources with cost and performance that have advantages over petroleum-based packaging materials and fibers.

The term "plastic", as used throughout this specification, is used broadly to include the bio- and mineral-based materials described above, and does not refer exclusively to petroleum-based products.

The innovations described herein permit a relatively inexpensive assembly process. By allowing premium printing on the plastic packaging material itself, the process saves the cost of an additional package insert, as well as the assembly costs of inserting such a package insert. Indeed, many of the steps described above can be effectively automated.

Another way to streamline the manufacturing process is to use paperboard or plastic cards for front and back portions (such as the first portion 12 and the second portion 16) that have been coated or laminated with rigid, semi-rigid, or flexible plastic or other materials prior to printing. These portions can be subsequently thermoformed in a conversion process prior to package assembly or in-line as part of the assembly process itself. Thus, the components fed into a form, fill and seal machine can already have portions that fill the role of the central film portion 14 or pre-formed portion 15 (FIG. 4) integrated into them. Alternatively, laminated paperboard or plastic materials can be potentially used as a substitute for the flexible, rigid, and semi-rigid materials currently used for thermoformed cavities. The laminated material can be formed into a cavity for receiving or securing a product for display in a finished package.

Cost savings can be achieved by allowing printing to occur on recycled materials. Recycled plastics can be obtained cheaply, reducing the costs of the necessary raw materials. Furthermore, by using recyclable materials, some costs can be recovered by reusing scraps or off-fall materials left over after the manufacturing process. Post-consumer recycling can be a source of raw materials, further reducing costs.

In some embodiments, a corrugated plastic material can be used to increase the strength of the package. For example, club stores or warehouse-style retailers often require packaging to be stackable and able to withstand the weight of multiple packages or other items stacked on top of the package. This can be especially useful when the packaged products are shipped in bulk on a large pallet, which can also serve as the display vehicle when the pallet is placed on the floor of Costco® or Sam's Club®, for example. The corrugated plastic material can comprise two flat external portions, with a third internal portion that bends back and forth, contacting the inside of one external portion and then the other. The corrugated plastic material can resemble corrugated cardboard in its structure, but it can greatly exceed the strength of typical corrugated cardboard. Materials that can be used to form corrugated plastic include high-density PET, which provides a relatively inexpensive option with good strength.

Figure 2:
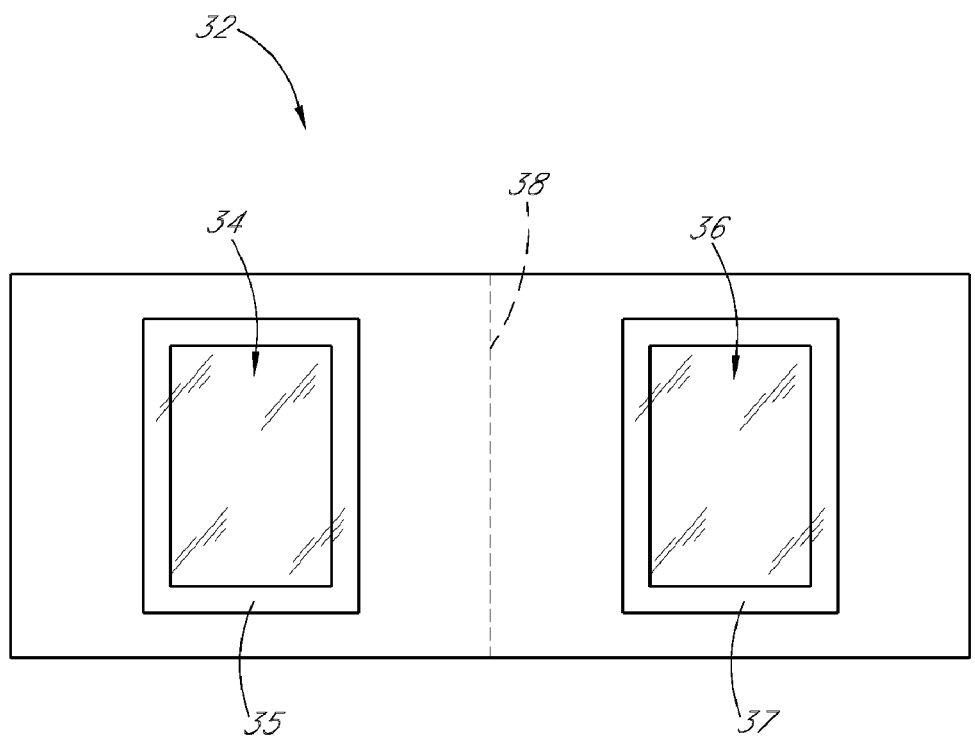
FIG. 2 shows an unassembled foldable package.

FIG. 2 shows another configuration of components that can be used to construct a plastic package containing a product. For example, instead of a first portion 12 and a second portion 16, the two portions can be combined into a single foldable portion 32. The foldable portion 32 can have two openings 34 and 36. Two center film portions 35 and 37 can be used, one extending across each opening 34 and 36, as illustrated. Accordingly, the film portions 35 and 37 can each be caused to protrude through the openings 34 and 36, respectively, and a product or products (not shown) can be placed into the cavity (or cavities) thus formed in the same manner illustrated in FIG. 1. The foldable portion 32 can then be folded along the line 38 and a product can be enclosed on both sides by the films 35 and 37.

Figure 3:
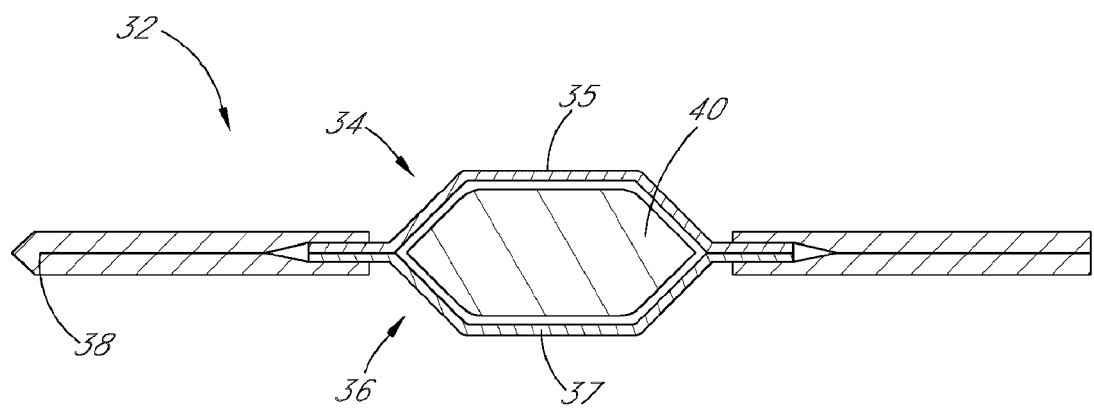
FIG. 3 shows a schematic cross-section of the package of FIG. 2 after assembly.

FIG. 3 illustrates a schematic cross-sectional view of a product 40 enclosed by the two films 35 and 37 after the foldable portion 32 has been folded along the line 38 such that the openings 34 and 36 have been aligned. The foldable portion retains the two films 35 and 37 between its folded sides. Accordingly, the two films 35 and 37 form an integrated cavity containing the product 40 and the cavity is held together by the foldable portion 32. Alternatively, the openings may not be aligned.

FIG. 4 illustrates another configuration of components that can be used to construct a package containing a product 18. In this embodiment, the components are generally similar to those described above and illustrated in FIG. 1, including a first portion 12, a second portion 16, and a product 18. However, instead of having a center film 14 that is stretched to form a cavity 24 and then reduced in size after the product 18 has been placed inside (as in FIG. 1), the embodiment of FIG. 4 shows a pre-formed portion 15 that has a cavity 25. The pre-formed portion can be formed from transparent plastic and can be placed into the opening 20 and adhered to the second portion 16. Thus, rigid or semi-rigid plastic materials can be used to immediately enclose a product 18, rather than the less-rigid film described above with respect to FIG. 1. In embodiments using rigid or semi-rigid plastic as described here, a heat sealing process can be used not only for the outer band (the area around the periphery of the package), but also to seal the inner band (the area around the opening 20). A sealing process that uses heat convection rather than the more targeted RF techniques can be an attractive option when the central portion is not formed from thin plastic film but instead the kind of thicker plastic that does not melt so readily. This has the advantage of efficiency and economy because it avoids further manufacturing apparatus and extra time; the package sealing can be accomplished in a single step.

The pre-formed portion 15 can be thermoformed in line (as a previous step in the same manufacturing system or at a previous station of the same machine used to fasten the components together and insert the product) or off line (by a machine dedicated to thermoforming large plastic sheets and cutting out the pre-formed portions to be fed later into a separate machine). The pre-formed portion 15 can alternatively be injection molded or vacuum molded, on line or off line. Injection molding can include injecting fluid materials (such as liquid plastic) into a mold and allowing the materials to fully or partially solidify, then removing the materials from the mold. Vacuum molding can include forcing a formerly flat sheet of material against a half-mold surface with a sucking force from a suddenly activated vacuum, for example. The material can retain the shape of the half-mold surface after molding, and can comprise a rigid or semi-rigid plastic material. One or multiple pre-formed portions such as the pre-formed portion 15 can be used in conjunction with a flexible center film such as the center film 14 (see FIG. 1) in the same package. For example, a more expensive or more central portion of a kit or grouped product offering can be enclosed in a more rigid plastic, while less expensive related products or peripherals can be enclosed in more flexible membranes so that all products adhere together in an integrated plastic package.

Examples of preferred packaging machines are the Rotary RT-72 and the Rotary SBR-8, in-line heat/RF sealing equipment, available from Sun Industries, Inc. of Goodland, Ind. Another example of packaging equipment that can be used to accomplish some of the methods described herein is a Multivac machine, manufactured by Multivac, Inc., of Kansas City, Mo. Other form, fill and seal equipment can also be used. Preferred machines function in-line, fully automatically, and have a high-volume output. In some embodiments, a machine can have vacuum or suction cavities underneath the web into which the central films 14 (see FIG. 1) can protrude and/or expand.

In some embodiments, a form, fill and seal machine can have a bed that is tooled with molds that heat and form plastic material to contours of the molds. The plastic material can be fed into one end of the machine from a roll of plastic. The machine then orients the plastic correctly with respect to the molds and forms the plastic into the shape of the mold. The molds can be formed from aluminum, for example. After the plastic is formed by the molds and cooled, if necessary, the product(s) is/are placed into the molded plastic. Then, the plastic backing (in the form of flat plastic film off a roll, for example) that preferably has been printed on one or both surfaces is fed into the machine, which seals the plastic backing to the molded portion, thus securely enclosing the product inside. The printed plastic backing can be formed from rigid or flexible plastic material or from a laminated paperboard, as discussed above. Moreover, the steps described above can be performed in various different orders.

Because the form, fill and seal machine can have multiple molds for multiple product packages, the machine can advantageously separate the individual packages from each other by a die cutting step. Advantageously, the sealing and cutting steps can be combined into a single die-cut seal step, where part of the die exerts pressure on the package to urge the portions together in a secure seal, while another part of the die is sharper and shaped to cut through the plastic adjacent to the sealed portion. The form, fill and seal equipment can be oriented horizontally or vertically with respect to the floor.

The specifications of any given machine can be described in terms of the machine's "web," measured perpendicularly to the machine's length. Machines with wider webs have more capacity to form packaging at any given position along the machine's length. Accordingly, even though machines with wider webs index—that is, move the packaging through—at slower absolute speeds than narrower web machines, the overall efficiency of the wider webbed machines can be greater. Thus, the larger the web, the more units per cycle can be formed at the same time. Some embodiments use narrow and/or wide web machines.

In some embodiments, rolls of printed paperboard and/or plastic materials are fed into a form, fill and seal machine from rolls. In a "lower web area," the machine forms the unprinted areas of the semi-rigid plastic sheets into product cavities (e.g., cavity 24) in-line. The product (e.g., the product 18) is then placed into the formed cavities. The printed, molded, product-containing plastic portions from the lower web area are then automatically heat or RF welded to corresponding paperboard sheets that are in an upper web area. Finally, the machine die cuts the packages into finished goods. Upper and lower web portions can be aligned using an electronic eye that locates hash marks or other markings on the rolled materials. Various optical alignment systems can be used, including CCD edge-detection systems. Alignment can be used at various discreet stages of the process or continuously, and can be especially advantageous during the product insertion, sealing and die-cutting portions of the process. Automating this process allows for cost reductions and higher productivity and output. The described process and machines can also allow packaging manufacturers to take advantage of the economies of scale to offer lower costs for high volume orders. A third, or "middle" web can also be incorporated into this system. For example, a middle web can include the central film portions 14 (FIG. 1) or semi-rigid portions that can be thermoformed in-line, rather than preformed (as with preformed portions 15 of FIG. 4).

Figure 5:
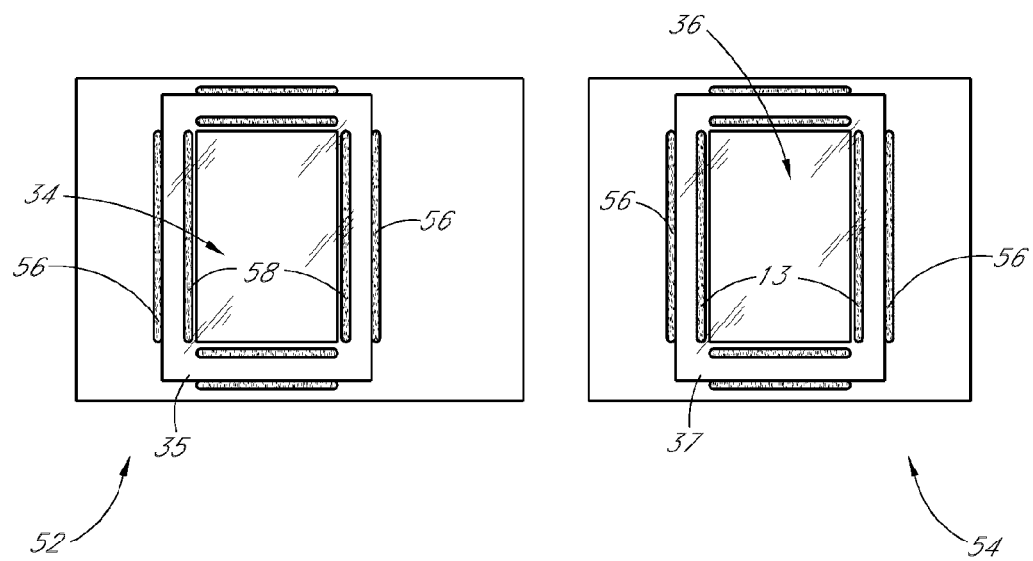
FIG. 5 shows an unassembled two-part package.

FIG. 5 shows another configuration of components that can be used to construct a plastic package containing a product. A longer portion 52 can have an opening 34 similar to the opening 34 of FIG. 2. A shorter portion 54 can have an opening 36 similar to the opening 36 of FIG. 2. Center film portions 35 and 37 can be positioned to cover the openings 34 and 36, respectively, as in FIG. 2. The longer portion 52 and the shorter portion 54 can be complementarily designed such that one adheres to the other in a pre-determined fashion. To facilitate adhesion, the center film portions 35 and 37 can have outer adhesive lines 56 at or near their perimeters and inner adhesive lines 58 located closer to the center of the openings 34 and 36. Although the adhesive lines 56 and 58 are illustrated on both the central film 35 and the central film 37, some embodiments have an adhesive line on only one of the two central film portions. Some embodiments can have a single adhesive line along one or each side of the openings 34 and/or 36. In some embodiments, the adhesive lines are not present but instead an RF, heat, or sonic welding process is used to create weld bands where the adhesive lines would have been located.

Figure 6:
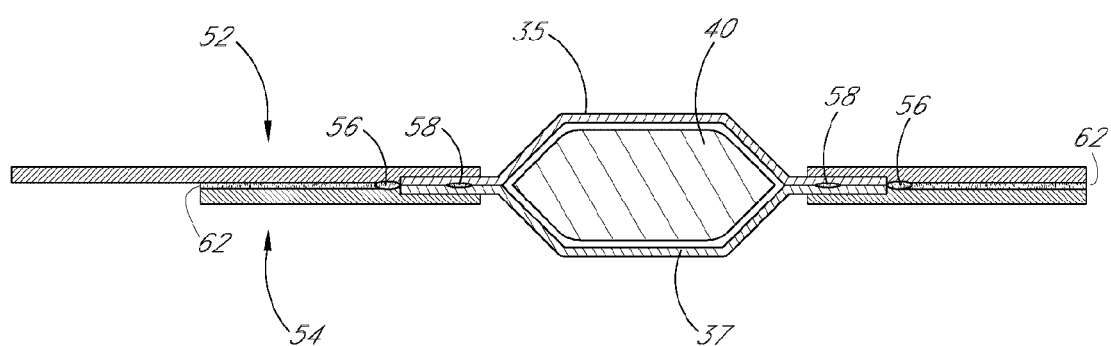
FIG. 6 illustrates a schematic cross-section of the package of FIG. 5 after assembly.

As illustrated in FIG. 6, the longer portion 52 and the shorter portion 54 can be adhered such that the two openings 34 and 36 are aligned. In this case, the longer portion can overhang the shorter portion 54 at one end. The overhanging portion can be translucent and/or include attractive visual effects which can be more striking when light passes through the overhanging portion. In some embodiments, the shorter portion 54 is formed from paperboard and the longer portion 52 is formed from plastic. Thus, in some embodiments, a package may include some surface areas of only plastic material through which light can pass, allowing enhanced printing, graphics, and other cosmetic improvements. In other embodiments, the shorter portion 54 is formed from plastic and the longer portion 52 is formed from paperboard, leaving a portion of the paperboard card overhanging. The overhanging portion can thus be perforated and easily torn from the package and used as a coupon, proof of purchase, redeemable portion, etc. The overhanging portion, visual effects, tear-off portions, etc. can also be incorporated into any of the other package configurations described herein, including the configurations of FIGS. 1 and 4.

The two central film portions 35 and 37 can be configured to contain and generally surround a product 40 between the two film portions 35 and 37 in an integral cavity, as with the product 40 of FIG. 3. When the longer portion 52 and the shorter portion 54 come together, the inner adhesive lines 58 from the two portions come together and the outer adhesive lines 56 from the two portions come together to help secure the package and product 40 in place. The loner portion 52 and the shorter portion 54 can also have adhesive applied on one surface so that an adhesive layer 62 is formed between the two portions. In some embodiments, the adhesive lines 56 and 58 can be omitted and the adhesive layer 62 can provide sufficient cohesion for the package. In some embodiments, the adhesive layer 62 is only present on some portions of the surface of the two portions 52 and/or 54.

FIG. 7 illustrates how narrow adhesive lines or weld bands can extend continuously around a central film portion 35. For example, an outer line 76 can extend around the perimeter of the central film portion 35 and can help adhere that portion to a plasticized paperboard portion, for example. Another inner line can extend around the perimeter of a portion of a central film portion 35 that covers an opening 70 (similar to the opening 20 of FIG. 1). Dual adhesive lines or weld bands can allow for graphics to be printed in between the lines without being distorted or otherwise changed by the adhesion or welding processes.

Some embodiments, as schematically illustrated in FIG. 7, for example, have adhesive lines (or weld bands) 76 and 78 that are relatively narrow. For example, these adhesive lines 76 and 78 can have a width of approximately 1/16 inch. Narrower adhesive bands can allow more surface area (in between the two bands, for example) for graphic effects and/or printing. Other embodiments have wider adhesive lines or weld bands. FIG. 7A, for example, schematically illustrates an embodiment having wider adhesive lines 76A and 78A. Wider adhesive lines can have a width of approximately 3/8 inch, for example. Wider adhesive bands can provide great strength and theft resistance. In some embodiments, dark printing or graphics can be applied to an overlying layer to obscure the adhesive from view in the final package.

Adhesion

In some embodiments, heat sealing techniques can be used to seal portions of the plastic packaging together. Heat sealing can have many advantages. For example, heat sealing machines are less expensive and readily available on the market. Furthermore, heat sealing machines can heat a larger surface area than other techniques, allowing for a backing (such as the first portion 12 of FIGS. 1 and 4) to be sealed to a front portion (such as the second portion 16 of FIGS. 1 and 4) of a plastic package. This can be accomplished by applying a heat-activated adhesive to the appropriate surfaces of the two package portions, and then using a heating element with a hot surface to press the two portions together while heating them and activating the bonding properties of the adhesive. Thus, heat sealing techniques can be used to seal two-piece plastic packaging cards or foldover, one-piece packaging cards through widespread heat application along the entire sealing surface of the package. Heat sealing techniques use hot plates that can be heated to an operating temperature in a general range of approximately 240 degrees Fahrenheit to approximately 400 degrees Fahrenheit. The seal can extend across greater surface areas with heat sealing than might otherwise be possible with RF sealing techniques. Furthermore, rigid and semi-rigid plastics can be sealed using heat-sealing techniques in cases where the materials may have structure (such as a molded flange) that may be too thick for RF sealing to work properly.

In addition to allowing thorough surface coverage for sealing applications, heat sealing is a good technique for use with unusual shapes in a package, or for a package with multiple openings (e.g., windows or cut-outs) for multiple products, for example. Some embodiments seal front and back portions of a package together in a narrow band around the periphery of the front and back cards of the package, as well as around the periphery of any product or other cavities in the package.

Whereas RF sealing is useful for creating narrow adhesion lines, heat sealing can be used for wider seal areas in various shapes. Thus, heat sealing techniques can be used to apply heat to specifically identified areas along the periphery of a package body by making contact with various combinations of the front, back, and peripheral edges of a flexible film (such as the central film portion 14 of FIG. 1), or rigid or semi-rigid cavities (such as pre-formed portion 15 of FIG. 4).

Heat sealing techniques can be used with various adhesive materials. For example, solvent-based or water-based heat seal coatings can be used. Furthermore, heat sealing techniques can allow for use of components (such as the first portion 12 and second portion 16 of FIGS. 1 and 4) that are coated with plastic, or poly-coated. Polyethylene ("poly") coatings can be applied in-line or by a "converter," after the materials have been manufactured. However, in some preferred embodiments, the poly coating is applied by the manufacturer (e.g., a paper mill) of the material for the first portion 12 and second portion 16, rather than in a secondary conversion process. Poly coatings can provide enhanced appearance and provide a basis upon which to print attractive graphics as discussed further below.

Various other methods of adhering the two portions can be employed. For example, the adhesive lines 56 and 58 of FIGS. 5 and 6 can comprise adhesive material that is activated by ultraviolet radiation. Alternatively, ultraviolet radiation can target the areas at or near the adhesive lines 56 and/or 58 and bond the underlying materials of the central films 35 and 37 of FIGS. 5 and 6 and/or the longer portion 52 and shorter portion 54 of FIGS. 5 and 6 together. Ultraviolet, or UV welding, has many advantages. For example, UV welding can achieve sufficient strength to provide theft resistance. UV welding can also be accomplished cheaply and efficiently, with relatively few steps. In some embodiments, an adhesive substance such as thermoset glue can be applied. After the two portions have been placed in contact with the thermoset glue, ultraviolet light can be shined on the glue and plastic. The ultraviolet light activates the adhesive properties of the glue. One advantage of UV welding is its adhesive strength. Using this approach, sufficient tamper-resistance can be achieved even though two plastic portions may not have features such as lips, locks, or snaps in addition to the adhesive material. Two flat, featureless surfaces can thus be strongly adhered to each other simply and effectively.

UV welding techniques can seal a wide array of materials. This provides for great latitude in design for visual effects in packaging. For example, UV welding techniques can be used to bond recycled polyurethane (RPET), a material that is difficult to seal with conventional techniques. Another material that can be bonded using UV welding is APET.

In some embodiments, the two plastic portions of the packaging can be closed together using a method such as stamping or heating. For example, a stamp can be used to exert pressure on the two plastic layers while they are in apposition. The pressure can seal the two portions together at or near the place where the stamp contacts the plastic. Another example uses heat to meld the two plastic portions together. This can be accomplished using a hot implement that contacts the packaging at various places around the perimeter while the two portions are in apposition, for example.

Sonic heat and RF welding methods can be used to fuse the two portions, for example. RF and sonic sealing methods send different wavelengths of energy to vibrate molecules of plastic and cause plastic portions to fuse together. For example, sonic sealing methods send acoustic energy into the plastic in the form of acoustic compression waves. RF sealing methods can transmit radio frequency energy into plastic at a wavelength that can be tuned to correspond to a vibratory wavelength of the molecules comprising the plastic material. Alternatively, UV and/or non-UV wavelengths of radiation can also be used to activate adhesives. An adhesive can be activated by microwave, infrared, radio frequency, or gamma ray radiation, for example. In one exemplary RF welding approach, two electrodes can be placed in close proximity to each other, but not in direct contact with each other. The electrodes can be permitted, however, to contact one or both of the plastic portions of the packaging. The plastic material can act as a dielectric that permits some electrical current to flow, but with some resistance. As the plastic resists current flow, electrical energy is converted into thermal energy and the heat melds a portion of the plastic packaging. This approach advantageously permits the two electrodes to not be independently heated. The heating effect can be reserved for the material to be heated such as the plastic, for example.

In some advantageous embodiments, adhesive substances can be used to chemically attach the two or more portions of a package together. For example, glue that cures over time as it dries can be used. Multiple-component glues can also be used, where one component is applied and another component activates the adhesive effect. In some embodiments, the packaging can be closed using a water-based urethane sealant. Advantageously, the adhesive may be applied only in areas where adhesion is to take place. Alternatively, the adhesive may be applied to an entire surface of one of the plastic portions. If glue is applied to an entire surface, the glue is preferably of the type that will not adhere permanently to the product. The glue may, for example, be applied to one portion of the packaging and then allowed to dry before the package is assembled. The glue in the adhesion areas can then be activated by heat, RF waves, ultrasonic waves, or another sealing method. Preferably, any adhesive used is transparent so as not to interfere with consumers reading any printing that may exist on either of the adhered portions.

In some embodiments, plastic features can be formed that complement other welding techniques. For example, abutting plastic portions can include raised ridges, narrow exposed channels, and the like. These features can allow welding to occur in conjunction with a roller or other mechanisms that can urge the corresponding plastic portions into proper contact. These features and mechanisms can cause an effective and strong plastic-to-plastic seal. They can allow the two plastic portions to mechanically interlock together.

In some embodiments, the adhesion only occurs in discrete areas of the package, and preferably in areas where the adhesion makes it very difficult to separate the two plastic portions. For example, adhering the two plastic portions together near the edges makes it difficult for a thief to effectively grasp the edges of both pieces in order to pull them apart. Furthermore, many of the fusion techniques described above, including RF welding, ultrasonic welding and UV welding, produce such a strong bond between the two plastic portions that it is virtually impossible for a thief to separate the two. Even if a thief could separate the two portions by peeling, the process would likely require a substantial amount of effort, and would produce an exceptional amount of noise, attracting the attention of other store patrons and/or store personnel, thereby effectively foiling any attempted larceny.

In some embodiments, external adhesion activation is not required. Examples of external adhesion activation are RF, heat, and sonic energy. Eliminating these portions of a production process can reduce cost and increase efficiency. For example, some adhesives can adhere and begin to cure immediately upon coming into contact with another material. Some embodiments use adhesive that is post-consumer recyclable, such as water-based adhesives. Use of adhesives for which activation is not required allows for a broader range of material combinations than would otherwise be available. For example, in some cases, various activation processes may discolor printing or warp materials. Eliminating the activation process can avoid such results. In some embodiments, an activation process may not work to adhere two different materials, but an adhesive can be used without requiring activation. In some embodiments, a material for which external activation energy is not required is RPET. Some RF sealing processes can require that the two to-be-bonded portions both be formed from the same kind of plastic so the energy frequency affects both portions. In some embodiments, a material that uses RF activation energy is APET. Thus, embodiments that do not require RF energy for bonding can allow for plastic and paperboard to adhere together. Accordingly, various materials can be mixed and matched to achieve various desirable effects.

In some embodiments, different sealing techniques can be used for different portions of a package. When a flexible, thin plastic film (such as the center film 14 of FIG. 1) is adhered over an opening (such as the opening 20 of FIG. 1), it can overlap the edges of the opening as described and illustrated above with respect to FIG. 1. When the first and second portions (such as the first portion 12 and the second portion 16 of FIG. 1) are adhered together, thereby securing the thin plastic film in place, some sealing techniques can cause the thin plastic film to melt or otherwise degrade, thereby compromising the package integrity. However, these same sealing techniques can be preferred for sealing other portions of the package together, where no thin plastic film is involved. In particular, heat sealing techniques may overheat a thin plastic film, either from temperatures being too high or from the contact time being too long. Thus, to seal two package portions (such as the portions 12 and 16 of FIG. 1) together in the area immediately surrounding an opening (such as the opening 20 of FIG. 1), an RF sealing technique can be used. RF can avoid melting the plastic film because while RF may require more energy, it generally has a shorter cycle than pure heat sealing. The area immediately surrounding the opening can be referred to as the "inner band." However, the "outer band" of the very same package—that is, the periphery of the first and second portions (such as the portions 12 and 16 of FIG. 1)—can be sealed with a stronger heat seal technique because there is no risk there of melting a thin plastic film portion. This can be especially advantageous when sealing a plastic portion to a paperboard portion, because heat sealing techniques can be used for these materials, while RF generally cannot be used effectively. In order to use two or more different sealing techniques on the same package, the "rule" (or area of the seal band) can be reduced so that the RF or heating contact head does not contact the whole package at once. For example, one RF head can be designed to contact one portion of the package, and another heat head can be designed to contact another portion of the package.

Eliminating constraints to material combinations can greatly reduce costs and allow for improved package presentation. One advantage from such freedom is the ability to create a 100% post-consumer recyclable package. Another advantage from such freedom is the ability to create packages from post-industrial or post-consumer recycled material. Such a package can comprise, without limitation, the following components: front and/or back portions can comprise SBS, RPET, APET, or PVC (with RPET and APET being preferred for recycling); printing can comprise standard lithographic or UV inks (with UV inks preferred for printing on plastic surfaces); and adhesives can comprise a blister coating on SBS or water-based adhesives for recycling.

In some embodiments, renewable and/or abundant resources can be used. For example, resins made from plants such as corn are highly renewable, and these resins can be used to make packaging materials (for example, PLA). Packaging materials can also be made from minerals that are very abundant in the earth's crust such as limestone (for example, Naturestone and/or Viastone). These renewable and/or abundant resources can be biodegradable.

Various materials from the following list can be combined in various ways to create packaging. This non-exhaustive list shows some of the advantages of various packaging materials. These materials can be combined to achieve a convenient mix of properties.

| Abv. | Material | Post Industrial Recyclable | Post Consumer Recyclable | Renewable | Abundant in Nature | Biodegradable |
|------|----------|----------------------------|--------------------------|-----------|--------------------|---------------|
| RPET | Recycled Poly Ethylene Terephthalate | X | X | | | |
| PP | Poly Propylene | X | | | | |
| APET | Amorphous Poly Ethylene Terephthalate | X | X | | | |
| HDPE | High Density Poly Ethylene | X | X | | | |
| LDPE | Low Density Poly Ethylene | X | | | | |
| PS | Poly Styrene | X | | | | |
| PLA | Polylactic Acid | | | X | | X |
| E-flute | Corrugated paperboard | X | X | X | X | |
| B-flute | Corrugated paperboard | X | X | X | X | |
| | Blister card | X | | X | X | |
| SBS | Solid bleached sulfate | X | | X | X | |
| NS | Naturestone/Viastone | | | | X | TBD |

In some embodiments, cured adhesive is unattractive when seen through one or more of the plastic portions it bonds. In such cases, the adhesive can be shielded from view by printing on the surface of the external surfaces of the packaging. For example, if a front or back portion of a plastic package has printing and/or graphics (such as a stripe) strategically placed over where the adhesive will be applied, such an approach can greatly improve the appearance of the package for a consumer at the point of sale. In some embodiments, the printing can extend across substantially the whole surface of the package, effectively shielding any unsightly adhesive underneath any portion of the package surface. In the embodiment of FIG. 1, for example, printing and/or graphics can completely cover the surface(s) of the first portion 12 and/or the second portion 16. In some embodiments, the printing intended to obscure underlying adhesive can be dark and thick to more effectively hide the underlying adhesive.

FIG. 8 shows a view of a multi-windowed packaging portion 816 with a first window 820 and a second window 821. The two windows 820 and 821 can have the characteristics and be formed according to the processes described above with respect to the opening 20 of FIG. 1. For example, the windows 820 and 821 can be die cut at the same time the multi-windowed packaging portion 816 is die cut from a roll of plasticized paperboard material, for example. Through the two windows 820 and 821 a central film portion 814 is visible. The same central film portion 814 is depicted in FIG. 9. As shown, the central film portion 814 need not have a shape corresponding to the shape of any particular window (e.g., the windows 820 and 821). Instead, the central film portion 814 can be coextensive with the multi-windowed packaging portion 816 itself, as illustrated. Furthermore, a product and product cavity need not protrude from the front of a plastic package. In some embodiments, a product is located within a cavity housed behind an opening such as the windows 820 and 821.

Figure 10:
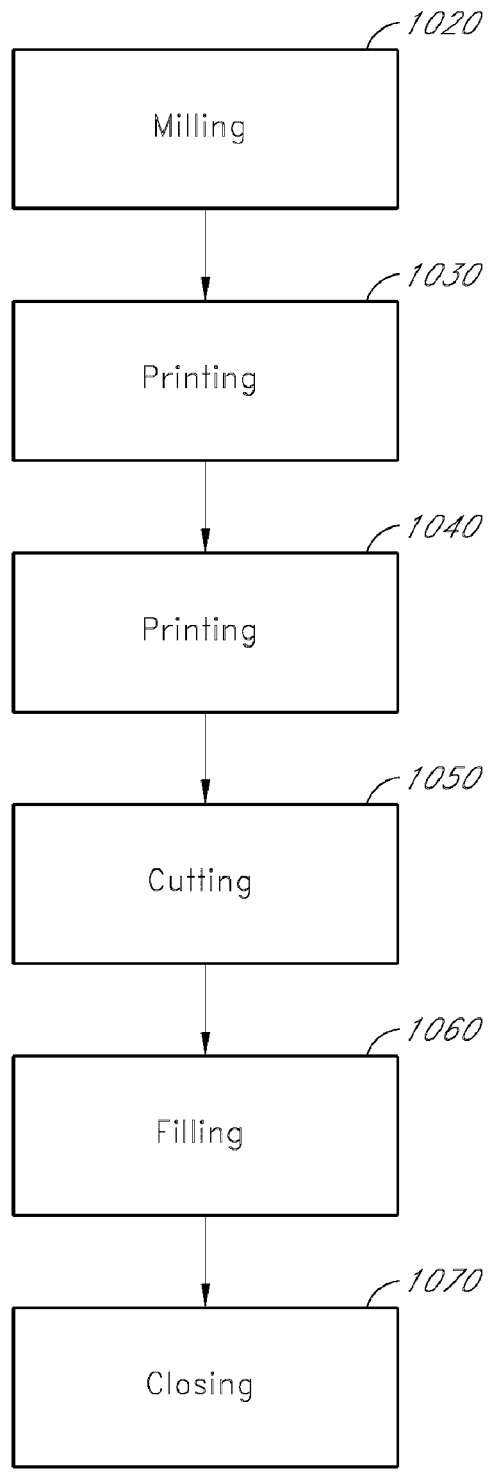
FIG. 10 shows a flow chart of steps in a plastic packaging production method.

FIG. 10 illustrates a method of manufacturing a plastic package. A milling step 1020 can comprise forming paperboard material into sheets and gathering the resulting sheets onto rolls. The milling step can further comprise incorporating webbing or other reinforcing materials into a paperboard material. The milling step can also comprise laminating or otherwise plasticizing paperboard material. If a plastic material is used, a milling step 1020 can include extruding a plastic material into sheets and gathering the resulting sheets onto rolls.

A printing step 1030 can comprise feeding the paperboard or plastic material through a printer. The printer can print on one or multiple surfaces of the material concurrently. In some embodiments, a second printing step 1040 can comprise sending the same material through the same or a subsequent printer.

A cutting step 1050 can comprise die-cutting portions of the paperboard or plastic sheet or cutting portions of the sheet with a rolling blade, for example. The cutting step can form smaller portions for one or multiple packages. Cutting step 1050 can also comprise folding portions of material if the resulting package is to have a crease. In some embodiments, the cutting step can comprise molding or stamping the paperboard or plastic portions to form contours intended to house the product or other items to be contained within the packaging. Such contours can be formed at the same time the paperboard or plastic sheet is cut if the cutting die also comprises a stamping mold. Such molding can also comprise heating or cooling the paperboard or plastic material. In some embodiments, the paperboard or plastic material can be vacuum molded. This technique employs a vacuum to force the material against a mold so that the material subsequently retains the shape of the mold. In some embodiments, paperboard material and plastic material is used. The paperboard material is die cut and the plastic material is molded, and the two are brought together as illustrated in FIGS. 1 and/or 4.

Filling step 1060 can comprise placing the product within the plastic packaging. Other items can also be placed within the plastic packaging, such as instructions, batteries, printed materials, companion items, other products, storage cases, refill containers, spare parts, assembly hardware, and the like.

Closing step 1070 can include a method of closing the plastic packaging. For example, heat sealing, RF welding, UV welding, and ultrasonic welding techniques can be used, which can include adhesive or glue materials. Preferred embodiments use heat sealing to adhere front and back portions of plastic packaging throughout a large surface area or around multiple openings (such as those illustrated in FIG. 8, for example). In some embodiments, complementary features are formed in the two portions of a plastic package that mate together. For example, tongue features can fit into groove features formed in the respective portions of a plastic package. Alternatively, tabs can be formed in one portion to fold over or protrude through a slot in the other portion. Some embodiments employ plastic lips, locks, or snaps that can be formed by shaping the plastic. For sufficient theft or tamper resistance, however, often these methods require additional sealing measures to be taken. Some potential additional measures include staples, rivets, and pins. The steps depicted in FIG. 10 and/or discussed here can be changed in any combination or order.

Figure 11:
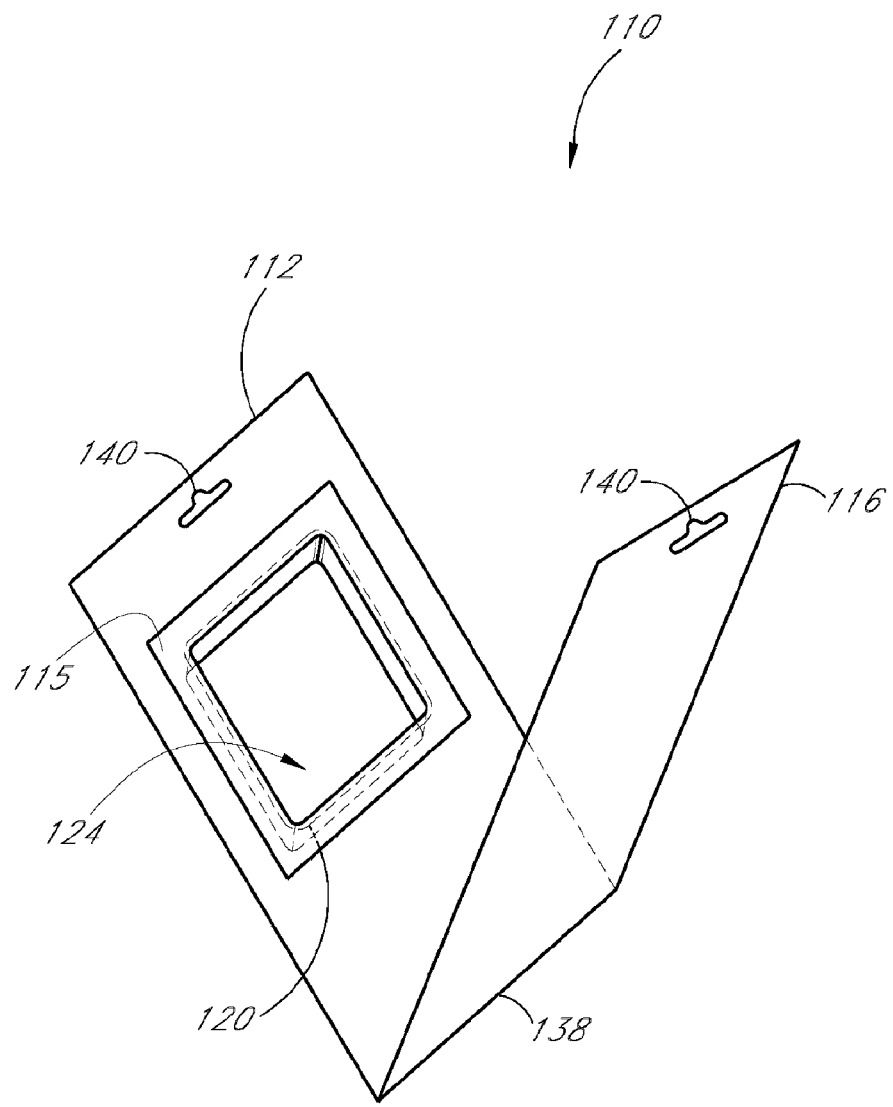
FIG. 11 shows a partially-assembled folding plastic package

FIG. 11 shows another embodiment of a folding package 110. In this embodiment, an opening 120 has been cut from the first portion 112 and a pre-formed portion 115 having a cavity 124 has been placed within the opening 120. A second portion 116 is connected to the first portion 112 along a fold line 138. If the second portion 116 is the front of a package, the product cavity 124 can protrude from the back of the package 110 and at least a part of the second portion 116 can be transparent to allow a consumer to see the product within the package. Two hanging holes 140 are shown, which can come together to be aligned when the package is closed to allow the package to be hung on a rack in a retail store, for example.

Theft Deterrence

Theft deterrence can be achieved in the packages described herein using the materials and adhesion techniques discussed above. For example, when a heat seal technique is used to allow a plasticized first portion 12 (FIGS. 1 and 4) to be sealed to a plasticized second portion 16 (FIGS. 1 and 4), thereby enclosing a pre-formed portion 15 (FIG. 4), the combined strength of the pre-formed portion 15, the plasticized portions, and the adhesive can make the package theft-resistant. In particular, it can be difficult to remove the pre-formed portion from the package. Furthermore, because of the strength and relative resilience of the pre-formed portion 15, that portion can be difficult to pierce as well. Moreover, if the various portions of the package are die cut in a single step or otherwise formed with tight tolerances, lips or prying surfaces can be minimized, making it difficult to find a place to grasp when attempting to pry the package apart.

Some plastic packages can be effective at deterring theft because they are difficult to fold, nearly impossible to tear open, and difficult to cut open without attracting attention. Some packages can be, however, quite expensive to manufacture due to expensive materials and high labor costs if non-plastic inserts are used to provide a place for printing words or designs. Embodiments disclosed herein overcome this dilemma by providing for printing directly on the plastic packaging material.

Some embodiments comply with theft deterrent standards published by various retail companies. For example, some retail establishments require that a theft resistant package have a minimum size. Some advantageous embodiments meet such requirements by being at least 15 inches wide by at least 13 inches tall. Other sizes can also be adequately theft resistant. Retail establishments also sometimes require plastic packaging materials to be of a minimum hardness or thickness. Some advantageous embodiments meet such requirements by being formed from a minimum of thirty-gauge plastic. Some embodiments meet such requirements by using plastic having a minimum caliper of 16 mil. Other thicknesses and properties can also be adequately theft resistant. Retail companies sometimes require that theft resistant packaging meet certain minimum closure requirements. Some advantageous embodiments meet these requirements by having multiple seal points in the plastic packaging around the product. Some preferred embodiments additionally have metal locking inserts and/or wire hooks that attach the product to the plastic. Some preferred embodiments meet these requirements by being "fully sealed," for example by using heat sealing or a water-based urethane on the interference fit edges. Some preferred embodiments are sealed so as to leave no openings or holes larger than ⅛ inch in diameter.

Printing

Figure 12:
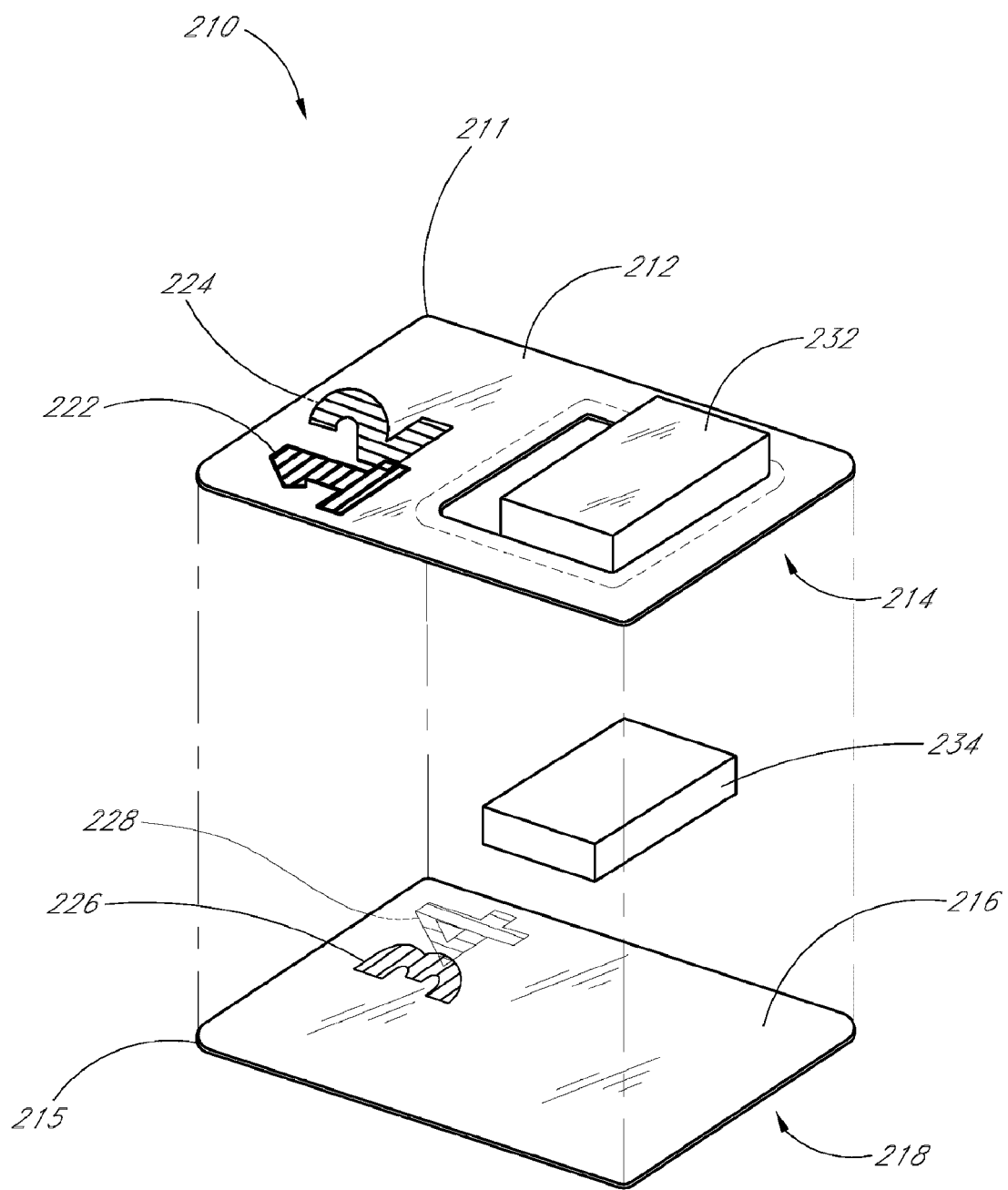
FIG. 12 shows an un-assembled plastic package with graphics.

As illustrated in FIG. 12, in some embodiments, the plastic (or plasticized or laminated) portions of packaging can be printed upon. For example, if a package has two complementary plasticized portions, each portion can have generally two surfaces. Each of the four surfaces can receive printed material in the form of words, designs, colors, layers of ink, etching, chemical effects, etc. In some embodiments, printing on multiple surfaces of plastic materials allows for special effects graphics, creation of transparent and/or translucent surfaces, and even three-dimensional effects. These and many other special graphical effects are possible by combining printing on plastics or laminated materials with printing on multiple surfaces of a package. Indeed, the quality of such graphics can be superior to graphics printed on a pure paperboard insert card.

In some embodiments, graphics can be improved by using a heat sealing technique as discussed above. For example, portions of the package can be printed prior to assembly. If an RF seal is used, the RF sealing process can distort the graphics or other printed material on the surface of the package. However, some heat sealing processes can allow the printed material on paperboard or coated paperboard to remain unchanged, even after the package has been heated to activate adhesion.

FIG. 12 illustrates one embodiment of a plastic package 210 having printing on multiple plastic surfaces. As shown, a package 210 can have a first portion 211 and a second portion 215. First portion 211 can have a first surface 212 and a second surface 214. Similarly, second portion 215 can have a third surface 216 and a fourth surface 218. As illustrated, each plastic surface can be printed upon. For example, first surface 212 can have printing 222 on it as illustrated by the numeral "1." Second surface 214 can have printing 224 on it as illustrated by the printed numeral "2." Printing 224 is visible through the plastic portion 215. When viewed from the front, the numerals 1 and 2 seem to partially overlap, even though the respective inks used to print the two numerals do not contact each other. This visual overlapping effect is made possible by printing on both surfaces of the plastic portion 215. Similarly, third surface 216 can have printing 226 on it as illustrated by the numeral "3," and fourth surface 218 can have printing 228 on it as illustrated by the numeral "4," as seen through the plastic portion 215.

Figure 13:
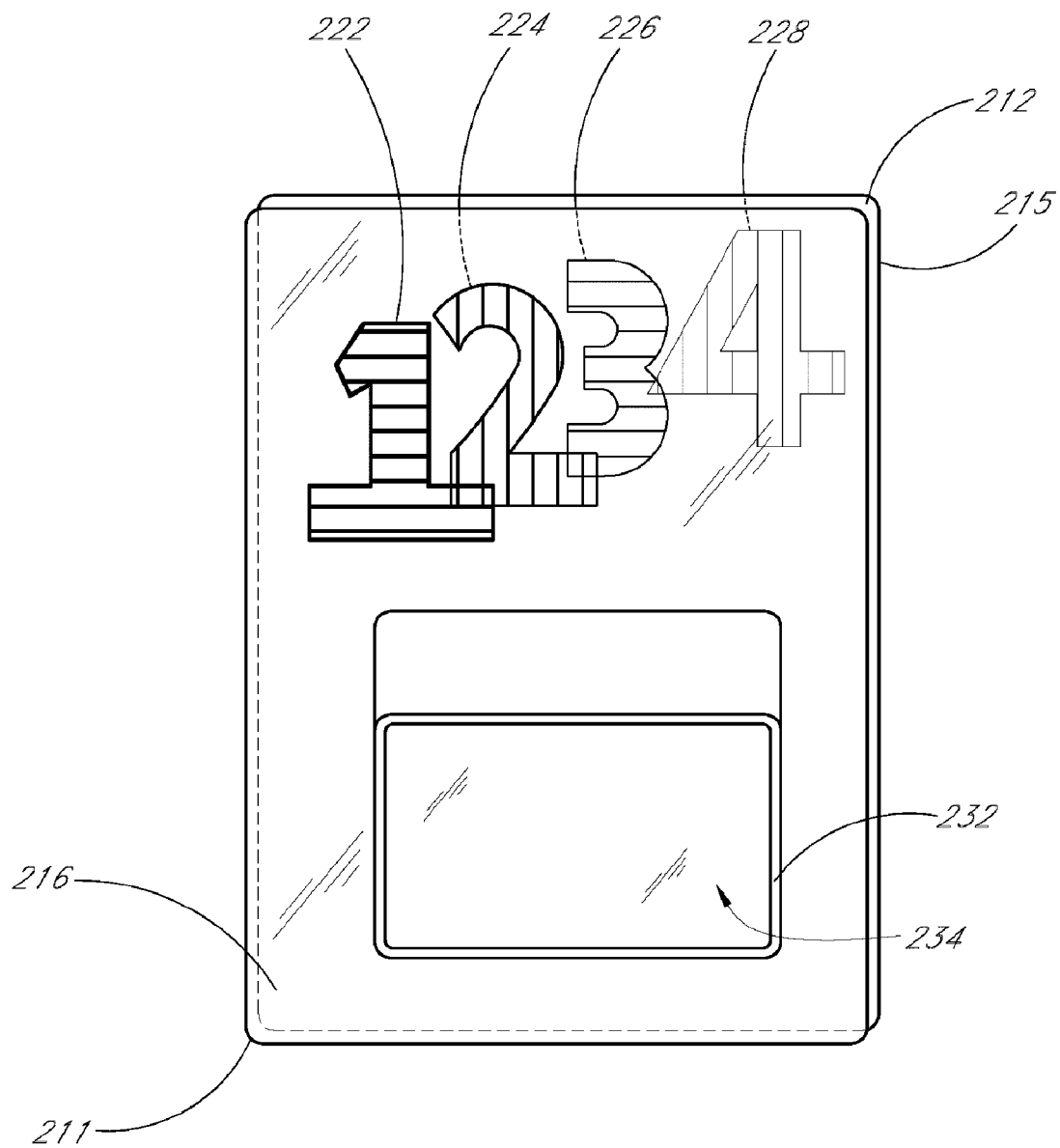
FIG. 13 shows an assembled plastic package with graphics.

FIG. 13 illustrates how the plastic portions 211 and 215 of FIG. 2 can come together, with product 234 sandwiched in between them. As shown, printed portions 222, 224, 226, and 228 (numerals 1-4) seem to overlap, even though only one numeral is printed on each of the four surfaces 212, 214, 216, and 218. The printing on the back surfaces of the two plastic portions 211 and 215 (surfaces 214 and 218) is indicated with vertical lines. The printing on the front surfaces (surfaces 212 and 216) of the two plastic portions 211 and 215 is indicated with horizontal lines. Thus, in the illustrated configuration, the numerals are visible to the observer despite the fact that some of them are farther removed from the viewer, being separated from the viewer by successive plastic portions. As shown, the numeral 1 is located closest to the viewer, followed by numerals 2 and 3, separated from the viewer by plastic portion 211, and finally by numeral 4, separated from the viewer by both plastic portions 211 and 215.

Multiple layers of printing can have many desirable benefits. Spectacular visual effects can be achieved by using combinations of four colors on multiple superimposed plastic surfaces. The color combinations used and the relative positioning of the patterns can be chosen to depict any number of unique designs. Multiple surface printing has the advantage of allowing visual depth and spatial effects to be more convincing and realistic. Printing in an overlapping manner also allows for a wide variety of design options.

Figure 14:
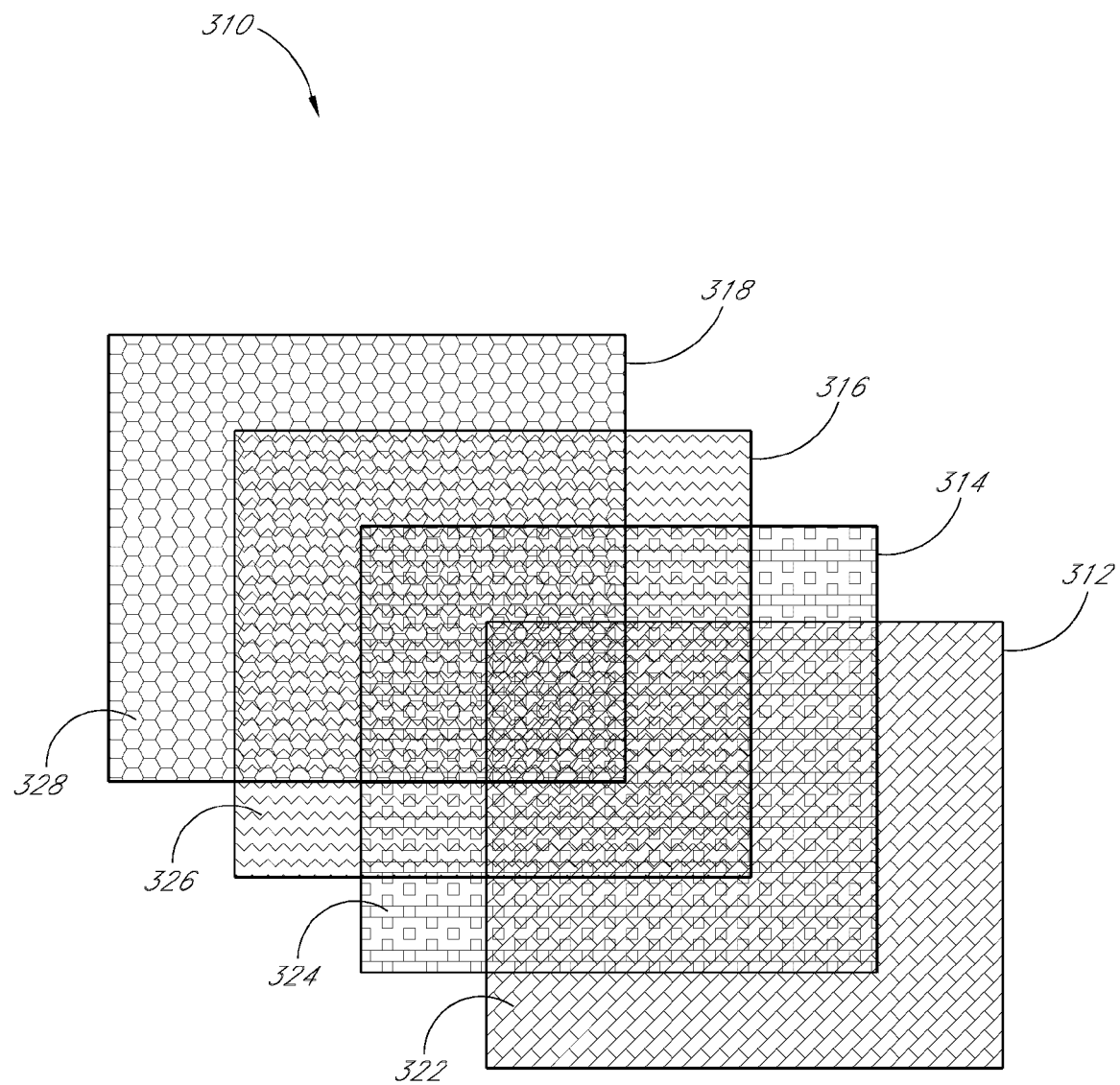
FIG. 14 depicts overlying patterns.

FIG. 14 illustrates one way in which layered printing can comprise complementary layers that are configured to create a visual effect when positioned one over another. In one embodiment, the illustrated layers do not represent separate plastic portions, but instead represent regions or surfaces that can accept printing. For example, the layers can represent the four surfaces of two plastic portions, such as the surfaces 212, 214, 216, and 218 in FIG. 12. In some embodiments, a first layer 312 can have a printed pattern 322. A second layer 314 can have a second pattern 324, a third layer 316 can have a third pattern 326, and a fourth layer 318 can have a fourth pattern 328. Each pattern can be printed on a surface of transparent plastic, thus allowing light to pass through each layer to some extent. This allows underlying layers to be partially visible through overlying layers. Furthermore, each pattern can have some portions that are opaque and some that are transparent, according to the lines and spaces in the printed patterns. Thus, as patterns overlay one another, visual effects are created that are unique to each pattern combination. The effect created by any pattern combination can also change according to the relative orientations of the two patterns to each other, either in a parallel plane or in a more complex spatial relationship. As FIG. 14 illustrates, combinations of overlying patterns can result in numerous new patterns and/or visual effects.

Figure 15:
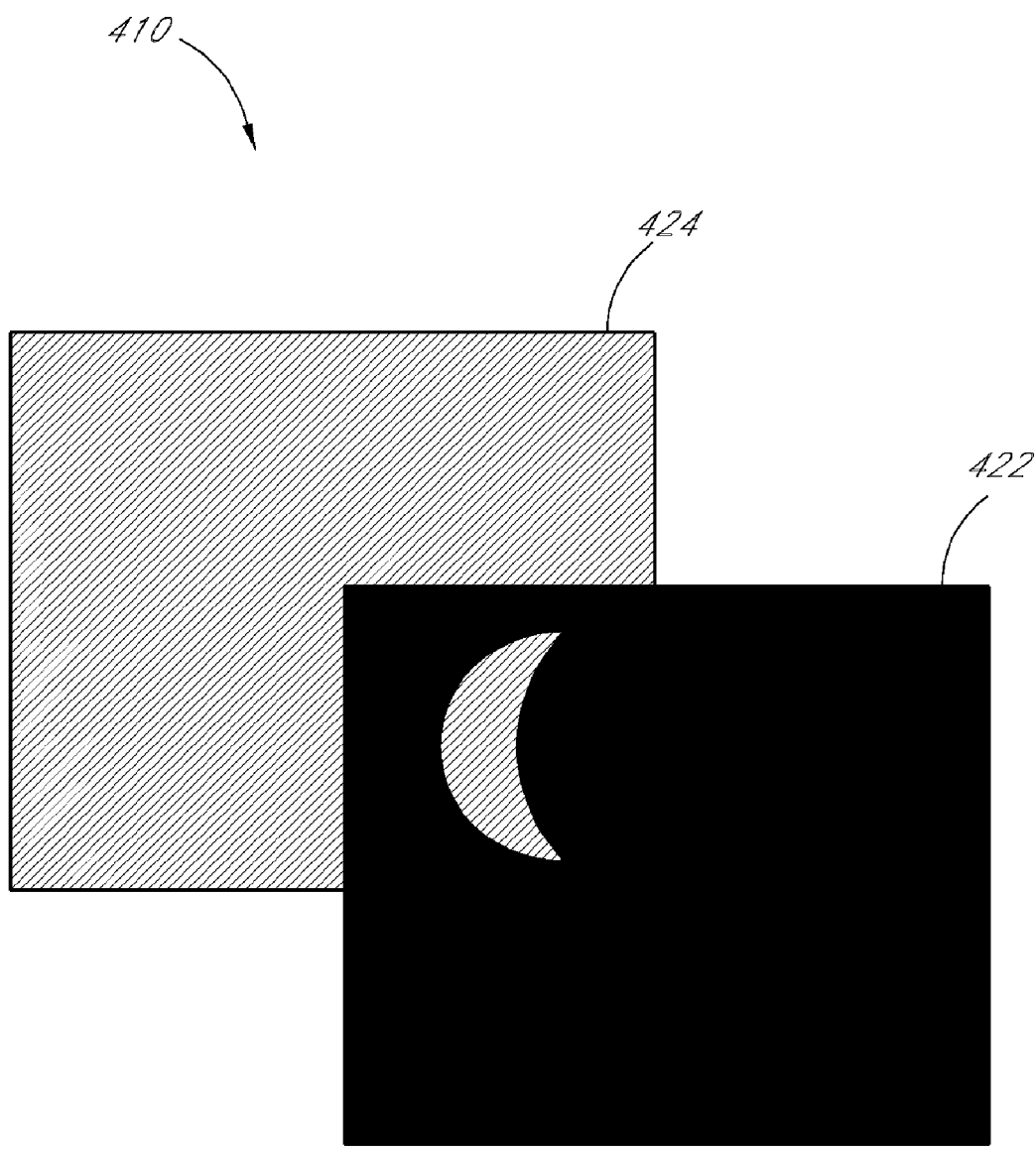
FIG. 15 shows a pattern showing through a portion of another pattern.

FIG. 15 illustrates another way in which multiple-layer printing can achieve visual effects. Masking pattern 422 can generally obscure anything that is located behind pattern 422. However, if masking pattern 422 is partially removed or is not printed on a portion of a transparent surface, a second pattern such as pattern 424 can be visible through the opening. This negative printing technique has great potential for striking visual effects, as can be seen in FIG. 15. Similar visual combinations can also be advantageous, such as a "peek-a-boo" printing effect, inverse, and or cutaway printing. Packaging materials can also be printed or sized to allow a portion of the product inside to be accessible to the sight or touch of a potential buyer.

Some embodiments capitalize on principles of artistic perspective. In some embodiments, for example, a design printed on an inferior surface positioned behind a superior surface can appear to be contained deep within or far behind the design of the superior surface. This appearance of perspective can be enhanced when printing appears on more than two surfaces of overlaid plastic material. Thus, appropriately printed images can create an enhanced sense of depth in a plastic packaging material with an otherwise more shallow appearance. In some embodiments, a printing process using combinations of multiple colors can lead to spectacular visual effects. For example, a four color process has many advantages. Some embodiments create translucent and lenticular effects. Some embodiments use spot color processes.

Figure 16:
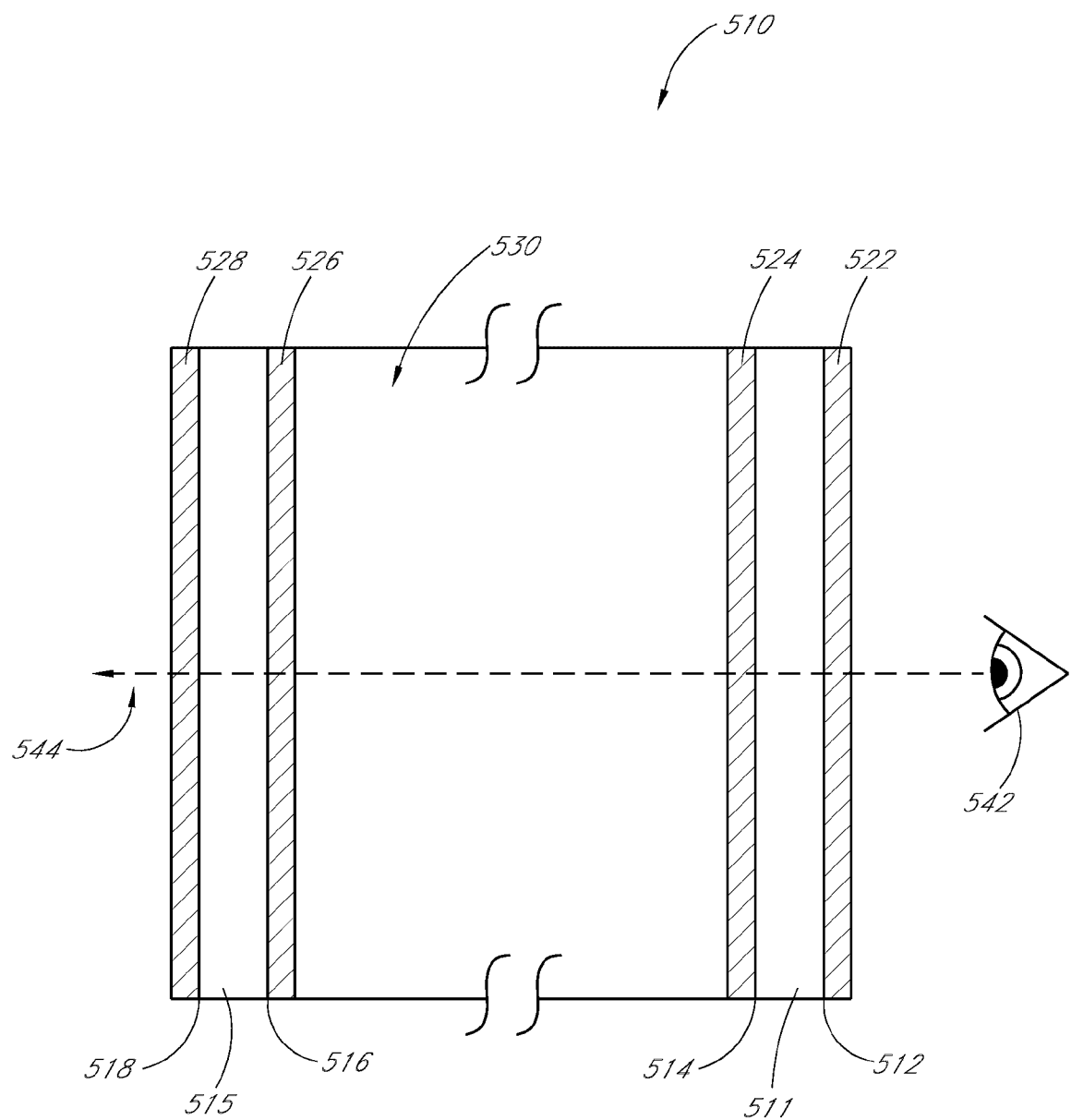
FIG. 16 illustrates a cross-sectional view of a plastic package.

FIG. 16 illustrates a cross-section of various layers that can comprise a packaging configuration 510. Layer 522 represents printing on a surface 512 of plastic portion 511. Printing 524 can also be located on surface 514 of plastic portion 511. An opening 530 can contain the product to be packaged, or it can be a gap, depending on where the cross-section of the package 510 is taken. On the other side of opening 530 is another plastic portion 515, having a surface 516 with a printed layer 526. Similarly, surface 518 can have a printed layer 528. As illustrated by eye 542, a viewer can see a combination of patterns comprising the various layers of printing and plastics in the line of sight 544 of the viewer, creating numerous potential visual effects.

Plastic portions 511 and 515 can be adapted to receive print. Printing layers 522, 524, 526 and 528 can be adapted to adhere to plastic surfaces or each other, including, in some embodiments, recycled PET, recycled PVC, and/or other recycled and/or recyclable plastics. When the plastic surfaces and/or printing materials are adapted to adhere, the ability of the plastic material to receive print eliminates the need to place a cardboard insert within the package, as with some prior art packages. Eliminating the cardboard insert can lower both the cost of producing the package itself, and the cost of assembling the product and package together. The cost of producing the package can be lowered because fewer materials are needed. The cost of assembling the product and package together can be reduced because the labor step of placing the cardboard insert within the package is eliminated.

One measurement unit of the strength, adhesion and resilience of printing is the "dynn" (pronounced "dīn.") Inks generally are approximately 33 dynn, but higher dynn ratings are stronger and frequently more desirable. For example, a 45 dynn printing procedure can allow a plastic portion to adhere to an ink layer, which in turn adheres to another plastic portion. If the dynn rating is high enough, the ink located between the two plastic portions will be able to withstand and assist in the adhesion process. Many plastics are hydrophobic and tend not to bond or mix with polar substances (such as water-based inks). One way to reduce this effect (and thereby increase the dynn rating) is to treat the plastic before applying the ink, preparing the surface to bond with the ink material. Higher dynn ratings can also improve an ink's scratch resistance, which can be useful for inks that are printed on the front, exposed portion of a package. In some embodiments, inks with higher dynn ratings are advantageously used on the back, protected surface of a transparent front plastic portion so that the printing and graphics can be seen through the plastic; the plastic thus adds a glossy sheen to the top of the printing as viewed from the front of a package.

Although FIG. 16 illustrates a printing layer adhered to each of the four plastic surfaces, some embodiments only have printing on one of the surfaces. Other embodiments have printing on only two of the surfaces. Other embodiments have printing on only three of the surfaces. More surfaces can also be included, and various other combinations of layered surfaces and printing configurations are contemplated.

Figure 17:
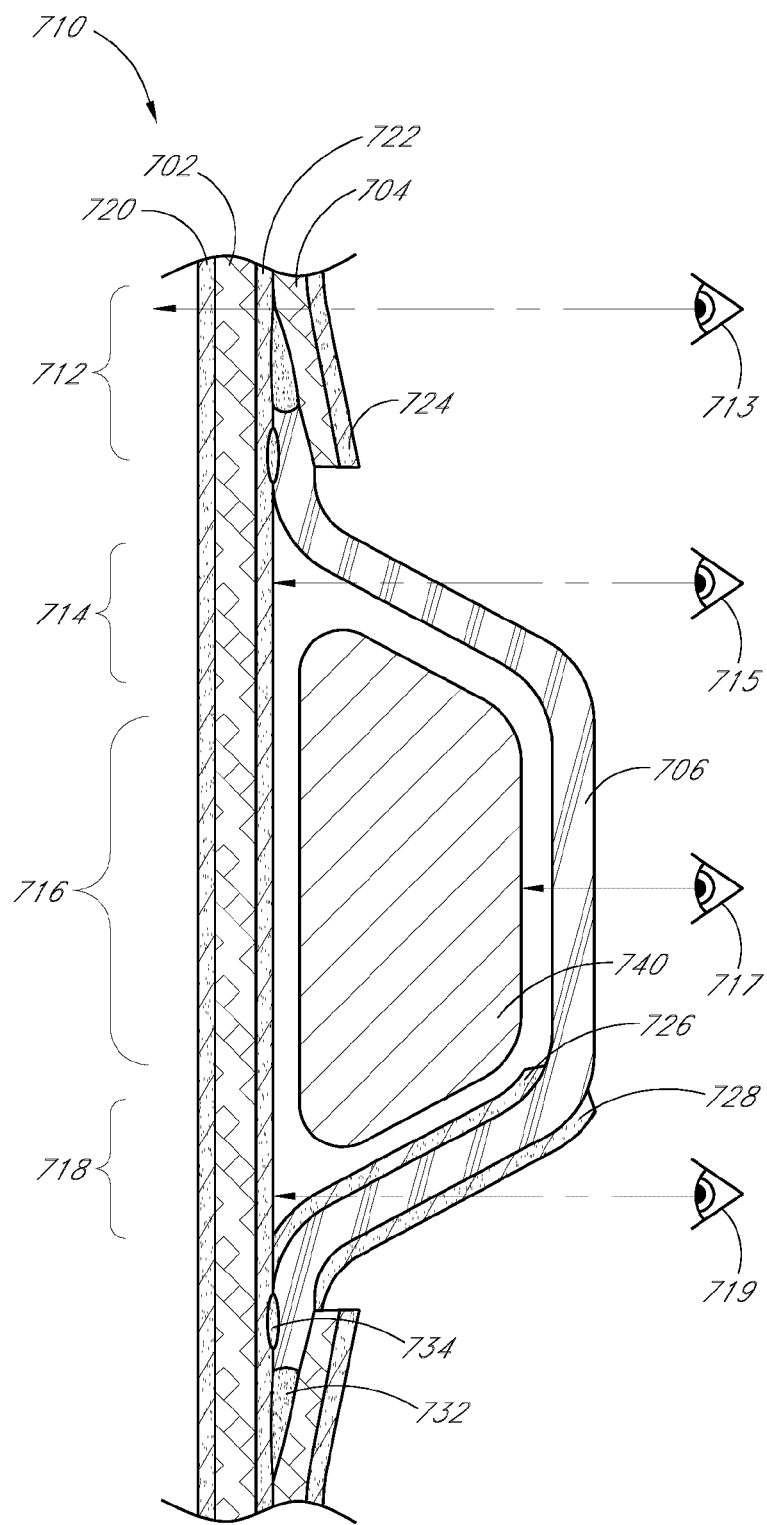
FIG. 17 illustrates a cross-sectional view of a plastic package and visible layers.

FIG. 17 schematically illustrates a cross-sectional view of a product within a plastic package 710. The plastic package comprises a back portion 702 and a front portion 704. The front portion 704 has a window through which a pre-formed plastic portion 706 protrudes to contain a product 740. The back portion 702 has a back coating 720 and a front coating 722. The front portion 704 has a front coating 724. The components are adhered together with adhesive portions 732 and 734.

The package 710 schematically illustrates several regions that can have visual effects. For example, a first region 712 can be seen from a vantage point 713. The front portion 704 and the back portion 702 can have various combinations of transparent, glossy, matte, printed, and or coated visual effects. Similarly, the coatings 724, 722, and 720 can combine for various visual effects. A second region 714 can have a combined visual effect as seen from a vantage point 715. For example, if the pre-formed plastic portion 706 is transparent, the coating 722 may be partly visible. If the coating 722 is partly transparent, the back portion 702 may be visible through both the pre-formed plastic portion 706 and the coating 722. A third region 716 generally contains a product 740. If the pre-formed plastic portion 706 is fully or partially transparent, the product 740 can be readily seen from a vantage point 717, for example. The product can also be seen, and potential visual effects can be provided, if the various layers are viewed from non-perpendicular angles. For example, the product 740 and the layer 722 can be seen through the pre-formed plastic portion 706 from the vantage point 713. A fourth region 718 is illustrated where the pre-formed plastic portion 706 has a back layer 726 of printing or coating and a front layer 728 of printing or coating. These layers, in combination with the other layers discussed above, can be seen from the vantage point 719, for example.

The appearance of plastic packaging can be enhanced using translucent and/or iridescent materials. For example, metallic, shimmering, highly reflective, and/or glittering effects can be created with some chemical substances. These substances can be used on one or multiple layers of the plastic packaging. Multiple layers of ink can also be printed onto a single plastic surface. Design and marketing potential increases drastically when printing can be accomplished on multiple surfaces of plastic packaging.

Figure 18:
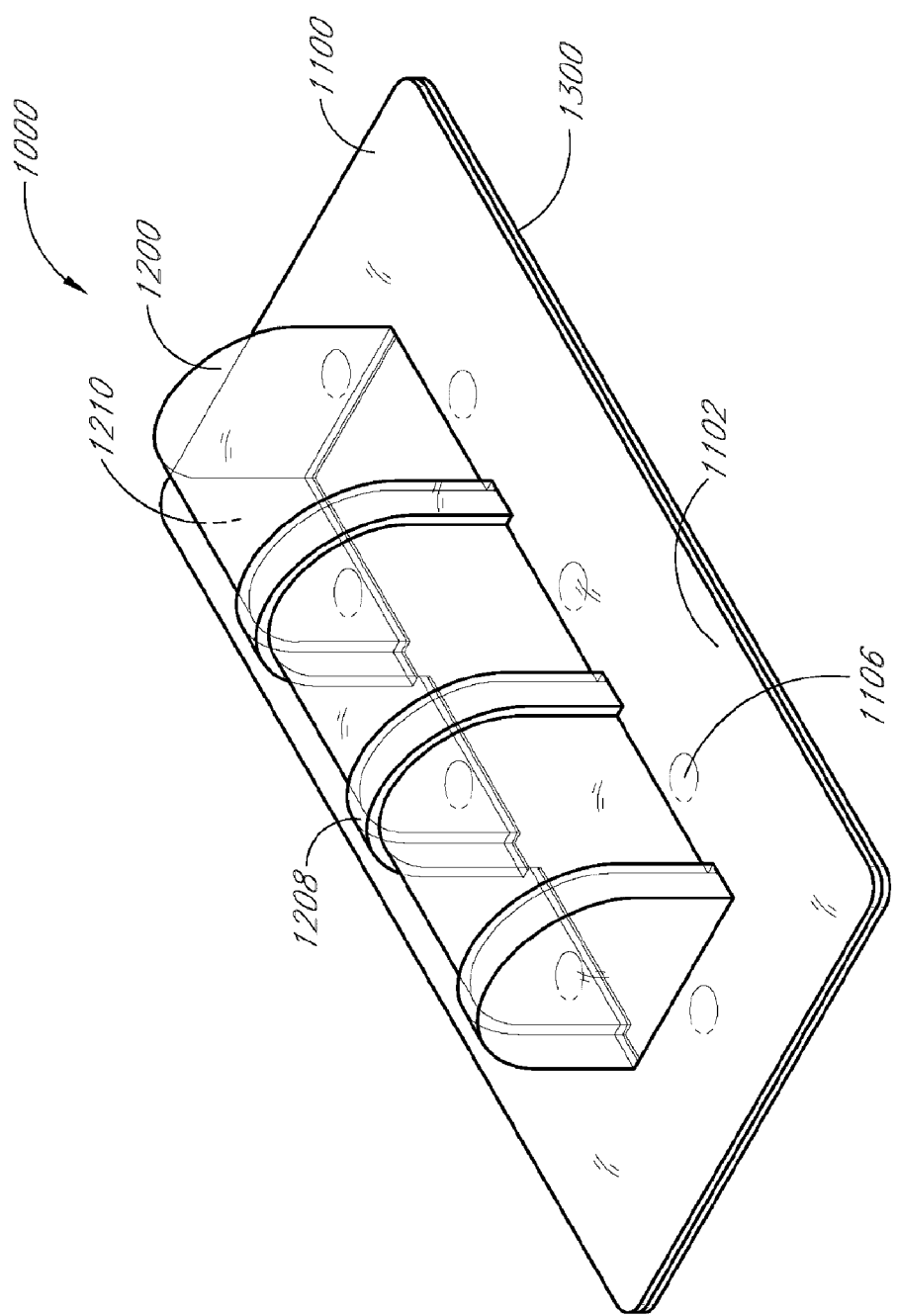
FIG. 18 illustrates another embodiment of a plastic package.

FIG. 18 illustrates an embodiment of a plastic package 1000. In the illustrated embodiment, a front panel 1100, a blister panel 1200, and a rear panel 1300 are combined to form a single package 1000. The package 1000 can have a cavity 1210 surrounded by a blister 1208 of the blister panel 1200. Additionally, the front surface 1102 of the front panel 1100 can have slight depressions 1106. In some embodiments, the depressions 1106 are subtle and difficult to see, and thus do not interfere with the smooth appearance and/or graphic presentation of the package.

Figure 19:
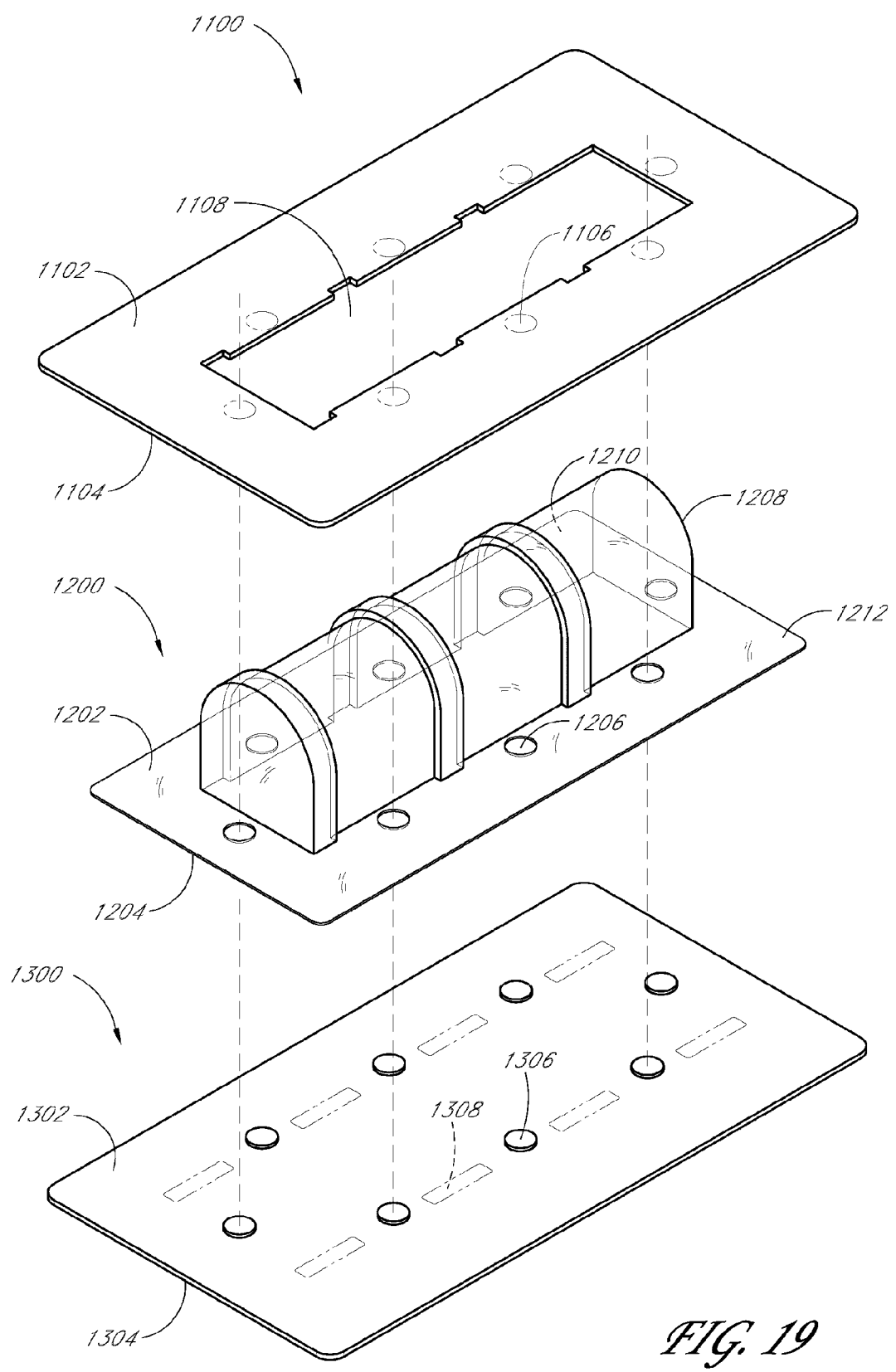
FIG. 19 illustrates an exploded view of the plastic package of FIG. 18.

FIG. 19 illustrates an exploded view of the plastic package 1000 shown in FIG. 18. The front panel 1100 can have a cutout 1108 appropriately sized and shaped to permit the blister 1208 to pass through it. In some embodiments, the front panel 1100 can have multiple cutouts for multiple blisters. The front panel 1100 can have decorative or useful art or marketing information on the front side 1102, as described above. The rear side 1104 can be bleached or colored, in some embodiments, or it can be unaltered in color to reduce manufacturing costs.

The blister panel 1200 can have a front surface 1202 and a rear surface 1204. A substantially planar flange 1212 can surround the blister 1208. In some embodiments, the blister panel 1200 can have multiple blisters. The blister 1208 can be located in the center of the blister panel 1200, as shown, but it can also be offset as appropriate for the particular packaging. The blister panel 1200 can have a plurality of holes 1206 passing through the flange 1212 and evenly spaced around the panel 1200. Alternatively, the holes 1206 may not be evenly spaced or distributed. The holes 1206 can be aligned with the depressions 1106 in the front panel 1100. (Indeed, this alignment can be the automatic result of a back portion [e.g., the back panel 1300] attaching to a front portion [e.g., the front panel 1100] through the holes 1206, which attachment can create the depressions 1106). The blister 1208 is preferably composed of a transparent material, and the flange 1212 can be transparent as well. Non-transparent materials can also be used. In some embodiments, the blister 1208 can be transparent, but the flange 1212 can be non-transparent.

The rear panel 1300 can have a front surface 1302 and a rear surface 1304. The front surface 1302 preferably includes attachment nodes 1306 aligned with the holes 1206 and depressions 1106 of the blister 1200 and front panel 1100. The attachment nodes 1306 can be physically altered in texture, material, or shape from the rest of the panel 1300, or merely designations for attachment locations. Attaching the panels in this region can physically alter the texture of the nodes 1306 and/or create round depressions at the nodes 1306 that correspond to the depressions 1106. The round depressions 1306 can be more easily visible from the rear side 1304 of the rear panel 1300.

The rear panel 1300 can also have a plurality of rectangular depressions 1308 on the rear side 1304. The rectangular depressions 1308 can be rectangular, as shown, or of another shape. (These depressions are referred to as "rectangular" here merely for convenience. For example, the depressions 1308 can be round, and the attachment nodes 1306 can correspond to rectangular depressions, in some embodiments. Indeed, any other regular or random shapes may be used). The illustrated rectangular depressions 1308 have a longer dimension in the direction of the long dimension of the package 1000. The rectangular depressions 1308 can be slightly more rigid than the rest of the panel 1300. The depressions 1308 can be formed by compaction of the panel 1300 at the appropriate location, which can occur when the rear panel 1300 is sealed to another portion of the package (e.g., the flange 1212 of the blister panel 1200). Increased rigidity can result from the process of sealing and/or compaction.

The blister panel 1200 can be placed between the front panel 1100 and the rear panel 1300 during assembly. A sealing method can be used to adhere the layers 1100, 1200, 1300 together. Such a method can include glue, RF sealing, thermal sealing, or any other appropriate method, such as riveting or embossing. Preferably, the sealing method does not deface the front surface 1102 of the front panel 1100 or the rear surface 1304 of the rear panel 1300, allowing aesthetically desirable printing to be disposed on these surfaces. The front panel 1100 can be secured to the rear panel 1300 through the holes 1206 in the blister panel 1200. The depressions 1106 can be caused by deformation of the front panel 1100 towards the rear panel 1300 as a result of assembly. Preferably, the depth of the depressions 1106 is minimized. Additionally, the attachment nodes 1306 of the rear panel 1300 can be used as positions to adhere the front panel 1100 to the rear panel 1300. During assembly, indentations can be formed in the rear side 1304 of the panel 1300. These indentations can correspond to the nodes 1306. Preferably, the indentations at the nodes 1306 are small. The indentations formed on the rear side 1304 can be so slight as to be not easily detectable and, preferably, these indentations do not interfere with the aesthetics of the rear surface 1304. The holes 1206 through which the depressions 1106 are joined to the nodes 1306 can be of sufficient number that the front 1100 and rear 1300 panels do not separate, absent user intervention. The holes 1206 can be appropriately spaced around the flange to deter theft of the enclosed product, for example.

The blister 1208 can be aligned to produce a cavity 1210 extending outward from the front surface 1102 of the front panel 1100. The cavity 1210 can be sized to accommodate commercial products for viewing through the transparent blister panel 1200. The rear panel 1300 can seal the rear opening of the cavity 1210 after assembly, keeping the commercial product in the cavity 1210. In some embodiments, the cavity 1210 is shaped as illustrated to contain a substantially cylindrical product or collection of products. In other embodiments, different shapes which correspond to the products to be packaged can be used.

In some embodiments, the arrangement of sealing locations 1106, 1206, 1306 and the depressions 1308 on the rear side 1304 of the rear panel 1300 can augment the rigidity of the package 1000, allowing it to resist curling during transport and storage, even when exposed to a level of heat sufficient to curl other packages. Some packages with similar components to the package 1100 have a large sealing location that may surround the whole product-enclosing space. (E.g., the sealing location can extend substantially around the opening in the blister 1208 along most or all of the flange 1212). Furthermore, some sealing techniques can seal the front portion 1100 to the blister portion 1200 from the front, and seal the rear portion 1300 to the blister portion 1200 from the back, but never seal the rear portion 1300 to the front portion 1100 through the blister portion 1200. By contrast, as depicted in FIG. 19, the sealing configuration can be "interwoven." The interwoven arrangement can cause the package 1000 to resist curling, even when the subcomponents may individually begin to curl under extreme heat, cold, or other conditions. This can take advantage of the different material properties of the subcomponents of a package. Thus, at a time when the rear portion 1300 may begin to curl, a blister portion 1200 may resist curling, or at least resist curling in the same way and/or at the same rate.

In some embodiments, depressions 1308 can be omitted, while the rear portion 1300 is still sealed to the front portion 1100 through the holes 1206. In other embodiments, for example, assembly can be completed by securing both the front 1100 and rear 1300 panels to the blister panel 1200, without holes 1206, but with depressions 1306. In such embodiments, different types of commercial products can be accommodated without reducing the rigidity of the packaging.

FIG. 20A illustrates a front view of the front panel 1100. The panel 1100 can be made from plastic, as described above, including petroleum- and PLA-based materials. In some embodiments, mineral-based materials are also used. The front panel 1100 has a cutout 1108 sized and shaped to permit the blister 1208 to protrude forward of the front surface 1102 of the panel 1100. The front panel 1100 is secured to the rear panel at the locations 1106 corresponding to the holes 1206 in the blister panel 1200 and the nodes 1306 in the rear panel. The number, size, and shape of the locations 1106 can be circular and evenly spaced around the cutout 1108 as shown. In some embodiments, a circuitous seal can be used, surrounding, either partially or completely, the cutout 1108 and corresponding blister 1208. In such embodiments, the seal can be disposed around the outside of the extent of the flange 1212 of the blister panel 1200.

The front surface 1102 can have aesthetically-selected content printed directly onto the surface 1102, or such content can be affixed to the surface.

FIG. 20B illustrates an embodiment of the rear side 1104 of the rear panel 1100. The attachment locations 1106 used to secure the front 1100 and rear 1300 panels together are illustrated as circular shapes. Other geometric and/or irregular shapes can also be used.

Figure 21A:
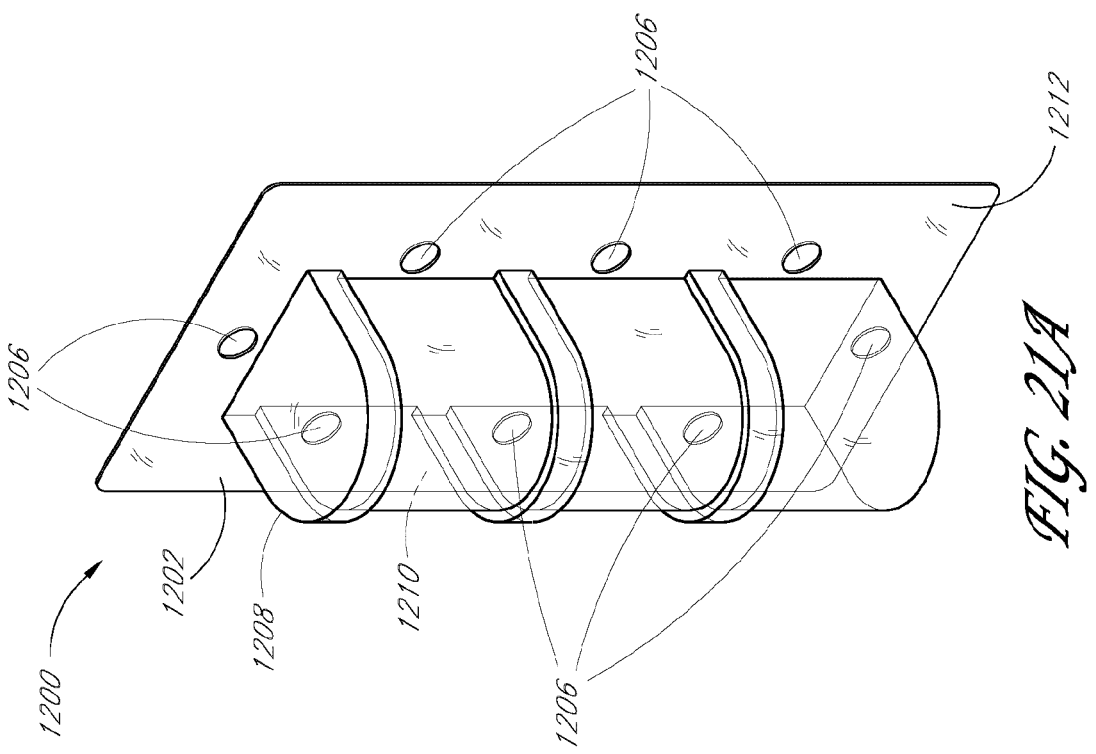
FIG. 21A illustrates a front perspective view of the blister panel of the plastic package of FIG. 19.

FIG. 21A illustrates a front view of an embodiment of a blister panel 1200. The blister panel 1200 can be composed of a transparent plastic, or a non-transparent plastic depending on whether or not the commercial product or other item to be enclosed in the cavity 1210 is to be viewable inside the package 1000. The entire panel 1200 can be composed of a single material, or different materials can be used to form different parts of the panel 1200. Some embodiments of the panel 1200 can be created by the molding of a substantially flat and planar portion of the material into a blister shape. Some embodiments of the panel 1200 can be created by other molding processes. The holes 1206 can be cut after molding, or integrally formed as part of a molding process.

The blister 1208 can be substantially cylindrically-shaped as shown, or can have other shapes. Similarly, although the illustrated embodiment depicts circular holes 1206 to permit sealing of the front 1100 and rear 1300 panels, other shapes can be used, even if the seal is still circular.

Figure 21B:
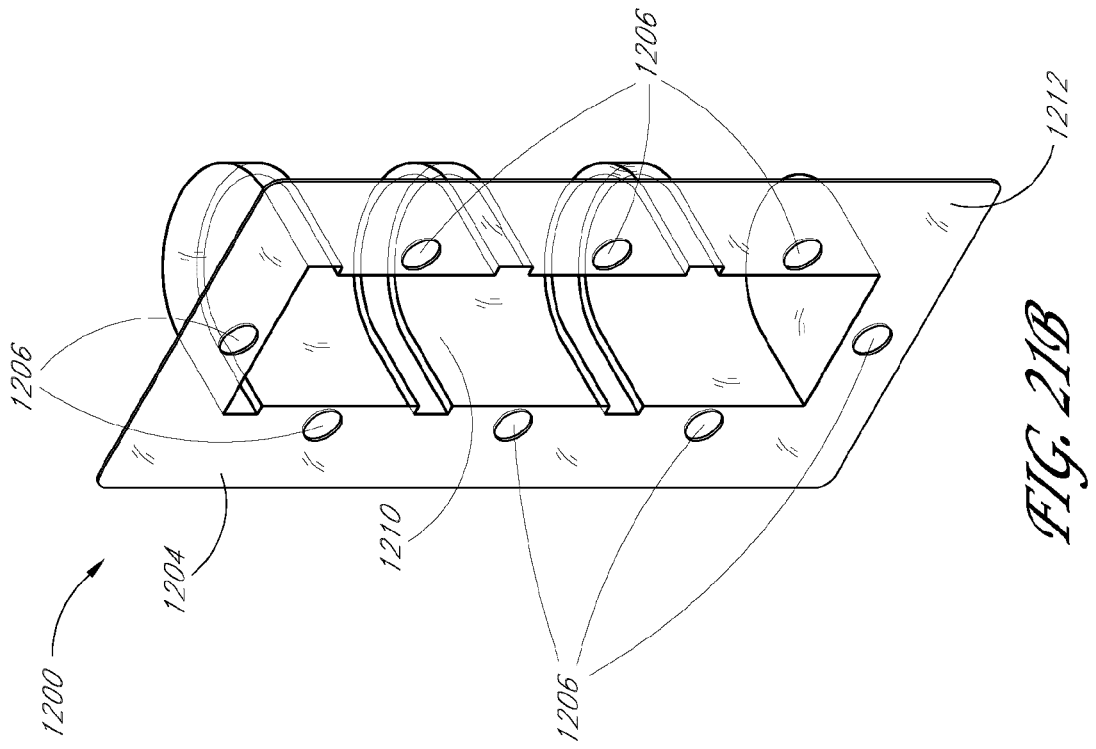
FIG. 21B illustrates a rear perspective view of the blister panel illustrated in FIG. 21A.

FIG. 21B illustrates a rear view of an embodiment of a blister panel 1200. In some embodiments, the cavity 1210 is completely accessible from the rear of the panel 1200. In other embodiments, a portion of the flange 1212 can extend inwardly around the perimeter of the cavity 1210. Such an extended portion (not shown) can assist in retaining products in the cavity.

Figure 22B:
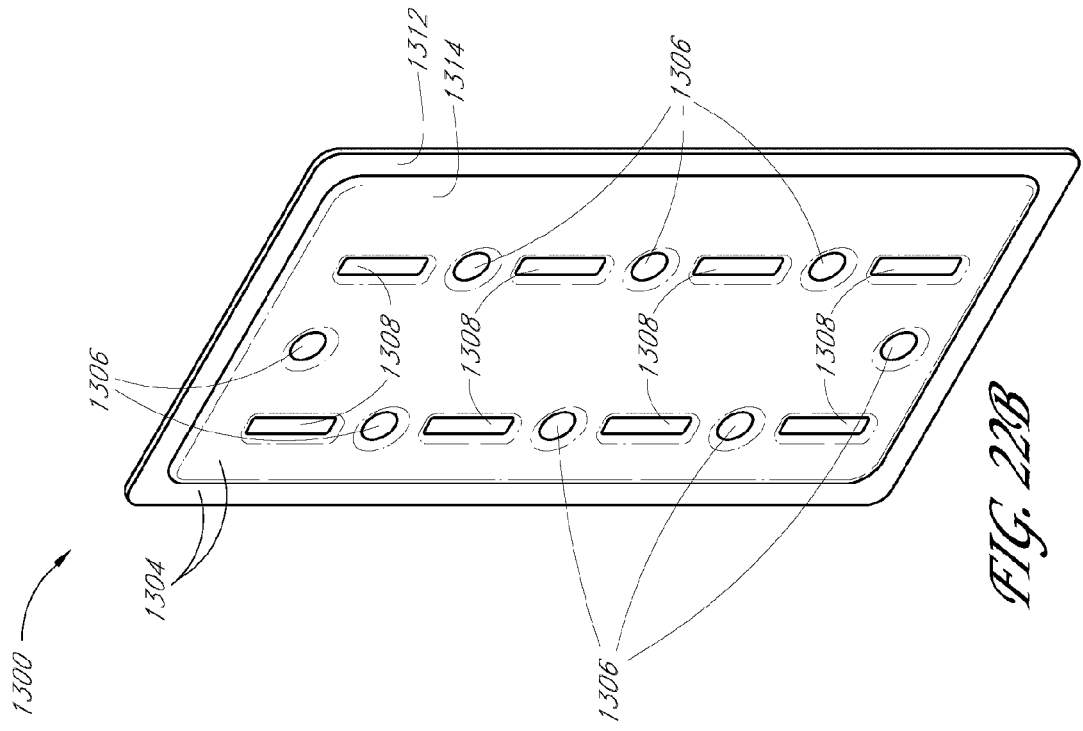
FIG. 22B illustrates a rear perspective view of the rear panel illustrated in FIG. 22A.
Figure 22A:
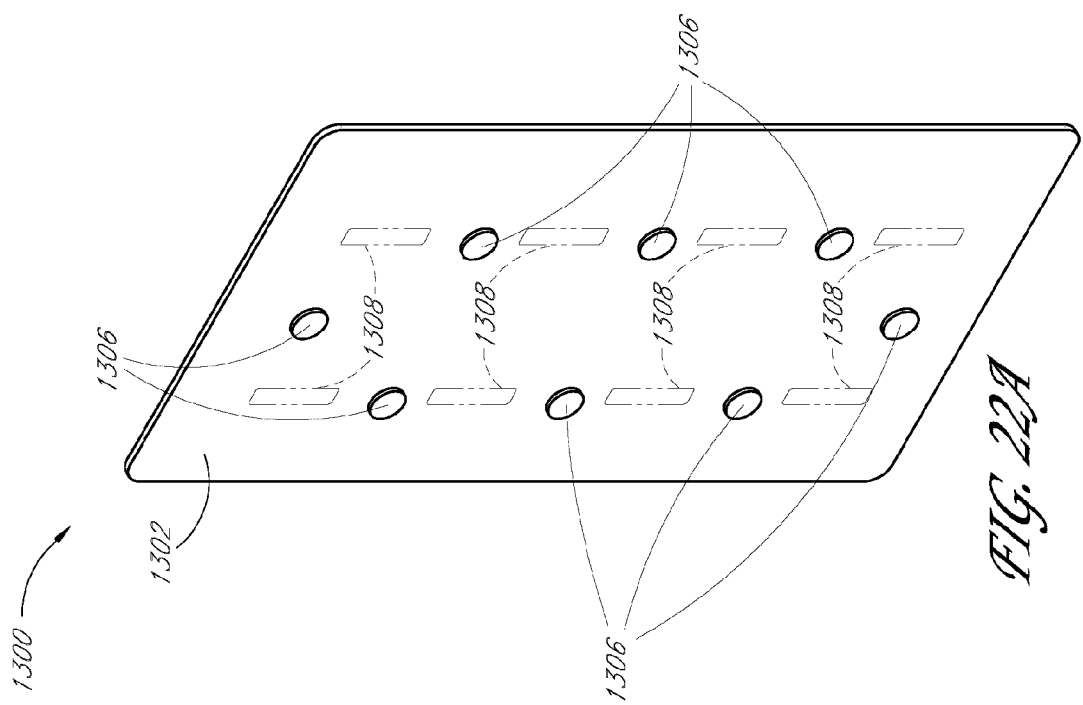
FIG. 22A illustrates a front perspective view of the rear panel of the plastic package of FIG. 19.

FIG. 22A illustrates a front view of an embodiment of a rear panel 1300. The rear panel 1300 can be composed of any of the plastic materials described above. In some embodiments, the front panel 1100 and rear panel 1300 are composed of the same material. In other embodiments, they are composed of different materials. Aesthetically- or commercially-appropriate content can be displayed on the rear surface 1304 of the panel 1300, either as printed or written on the panel directly, or by affixing such content to the rear panel 1300. In the illustrated embodiment, nodes 1306 for affixing the front surface 1302 of the rear panel 1300 to the rear surface 1104 of the front panel 1100 are displayed as circular locations. Although the nodes 1306 in the illustrated embodiment are evenly distributed around the blister area, other embodiments can use different arrangements.

FIG. 22B illustrates a rear view of an embodiment of a rear panel 1300. In some embodiments, the rear surface 1304 can have depressions 1308. The depressions 1308 can be the result of compaction of the rear panel 1300 at the indicated locations, where a metal head can be forced against the rear panel 1300 during the sealing process. In some embodiments, the depressions 1308 can be where the rear panel 1300 is sealed directly to the blister panel 1200 (in contrast to the nodes 1306 which can be where the rear panel 1300 is sealed directly to the front panel 1100, through holes in the blister panel 1200). The depressions 1308 can be oriented in other directions than those shown in the illustrated embodiment. Additionally, they can have different shapes. The depressions 1308 can increase the stiffness of the rear panel 1300, which can increase the stiffness of the assembled package 1000. Increasing the stiffness of the package 1000 can increase its resistance to curling when exposed to heat. Additionally, stiffer packages better maintain their shape when displayed or stored with weight placed upon them, such as when they are displayed beneath other packages, or when hanging. Some embodiments do not have the depressions 1308.

As illustrated in FIG. 22B, the rear surface 1304 can have a peripheral band 1312 that is compressed, similar to the compressed depressions 1308 and the compressed nodes 1306. The peripheral band 1312 can be formed during assembly when the rear portion 1300 is sealed to the front portion 1100. In some embodiments, the various compressed portions can be formed in a single manufacturing step when a sealing implement (e.g., an RF or heat and/or pure pressure sealing head) is pushed against the rear portion 1304 of the package 1000. There can also be a non-compressed, "puffy" portion 1314 between and around the compressed portions. In some embodiments, the flange 1212 can be located generally underneath the puffy portion 1314. However, the flange 1212 can be secured in between the puffy portion of the rear panel 1313 and the front panel 1100. The seal occurring at the depressions 1308 can prevent the blister panel 1200 from moving relative to the rear panel 1300. The seals that occur at the nodes 1306 can traverse the holes 1206 and thus constrain movement of the flange 1212 without having a direct seal to the flange 1212. Similarly, the seal between the front panel 1100 and the back panel 1300 at the peripheral band can also constrain movement of the blister panel 1200 with respect to the front and rear panels. The combination of three panels, sealed to each other in an "interwoven" way, can prevent curling of the package and allow for flat, smooth surfaces of the package to remain intact even after harsh shipping conditions.

The foregoing description sets forth various preferred embodiments and other exemplary but non-limiting embodiments of the inventions disclosed herein. The description gives some details regarding combinations and modes of the disclosed inventions. Other variations, combinations, modifications, modes, and/or applications of the disclosed features and aspects of the embodiments are also within the scope of this disclosure, including those that become apparent to those of skill in the art upon reading this specification. Thus, the scope of the inventions claimed herein should be determined by a fair reading of the claims that follow.

What is claimed is:

1. A printed package comprising mineral-based material, the package comprising:
   a flat back portion having a generally smooth appearance that is thereby configured to not interfere with the graphic presentation of the flat back portion having printing thereon, having a first opening therein, and having at least one compacted region, the flat back portion being formed of fluted material;
   a flat front portion having a smooth appearance that is thereby configured to not interfere with the graphic presentation of the flat front portion having printing thereon and having second and third openings therein, the flat front portion being formed of a limestone-based material;
   a central blister portion having a cavity portion and a peripheral region extending outwardly from the perimeter of the cavity portion, wherein the central blister portion comprises recycled polyethylene terephthalate;
   wherein the at least one compacted region overlaps an edge of the peripheral region of the central portion to secure the peripheral region of the central portion in place between the first flat portion and the second flat portion and wherein no portion of the at least one compacted region of the central blister portion thereby providing the generally smooth appearance of the flat back portion,
   wherein a first window of the cavity portion is visible through the first opening in the flat back portion, and
   wherein a second window and a third window of the cavity portion are visible through the second opening and the third opening, respectively, of the flat front portion.

2. The printed package of claim 1 wherein the central blister portion is at least partially transparent.

3. The printed package of claim 1, wherein the fluted material of the flat back portion comprises styrene-butadiene-styrene (SBS) material.

4. The printed package of claim 1, wherein the fluted material of the flat back portion comprises E-flute corrugated paperboard material.

5. The printed package of claim 1, wherein the first window protrudes outwardly from the first opening in the flat back portion.

6. The printed package of claim 1, wherein the second window protrudes outwardly from the second opening in the flat front portion and the third window protrudes outwardly from the third opening in the flat front portion.

7. The printed package of claim 1, wherein the central portion further comprises a plurality of holes spaced around the peripheral region, the holes extending entirely through the peripheral region, and wherein the flat back portion is secured to the flat front portion through the holes.

8. The printed package of claim 7, wherein the flat back portion comprises a plurality of compacted regions adjacent the locations at which the flat back portion directly contacts, and is secured to, the flat front portion through the holes.

9. The printed package of claim 8, wherein the flat front portion and the flat back portion are secured through the use of an adhesive.

10. The printed package of claim 1, wherein at least one compacted region is formed by stamping or by heating.

11. A printed package comprising mineral-based material, the package comprising:
    a first flat portion having a generally smooth appearance, printing thereon, and a plurality of compacted regions of increased stiffness that are subtle and difficult to see, and thus do not interfere with the generally smooth appearance and graphic presentation of the first flat portion;
    a second flat portion having a smooth appearance, printing thereon, and an opening therein, the second flat portion being formed of a mineral-based material; and
    a central blister portion with a peripheral region positioned between the first and second flat portions and a cavity portion protruding from the opening, the central blister portion being formed of preformed rigid or semi-rigid plastic, the central blister portion being formed of a different material than the first flat portion and the second flat portion,
    wherein the central blister portion has a plurality of holes spaced around the peripheral region, the holes extending entirely through the peripheral region, and
    wherein the plurality of compacted regions correspond to locations at which the second flat portion directly contacts, and is secured to, the first flat portion through the holes such that there is no intervening blister material between the second flat portion and the first flat portion, thereby augmenting rigidity of the package and allowing the package to resist curling and allowing for flat, smooth surfaces of the package,
    wherein the plurality of compacted regions comprise depressions formed by deformation of the first flat portion towards the second flat portion through the holes in the peripheral region of the central blister portion, and
    wherein the second flat portion directly contacts, and is secured to, the first flat portion within a vertical depth of the plurality of holes such that neither the first nor second flat portion crosses entirely through any of the plurality of holes.

12. The printed package of claim 11, wherein the central portion comprises recycled polyethylene terephthalate.

13. The printed package of claim 11, wherein the first flat portion comprises an opening.

14. The printed package of claim 13, wherein the cavity portion protrudes outwardly from the opening in the first flat portion.

15. The printed package of claim 11, wherein the mineral-based material comprises limestone.

16. The printed package of claim 11, wherein the first flat portion comprises paperboard material.

17. The printed package of claim 16, wherein the first flat portion comprises E-flute corrugated paperboard material.

18. The printed package of claim 11, wherein the plurality of holes are regularly spaced around the peripheral region of the central blister portion.

19. A printed package comprising mineral-based material, the package comprising:
- a first portion formed from a mineral-based material having a generally smooth appearance that is configured to display printing thereon in a manner that does not interfere with the generally smooth appearance and graphic presentation of the first portion;
- a second portion having a smooth appearance that is configured to display printing thereon in a manner that does not interfere with the smooth appearance and graphic presentation of the second portion and having an opening therein; and
- a central portion with a peripheral region positioned between the first and second portions and a cavity portion protruding from the opening;
- the first portion and the second portion being secured together to secure the peripheral region of the central portion in place, without any outward protrusions beyond the surfaces of the first and second portions.

20. The package of claim 19, wherein the second portion is also formed from the mineral-based material.

21. The package of claim 20, wherein the mineral-based material is limestone.

22. The package of claim 19, wherein the central portion is formed from the mineral-based material.

23. The package of claim 22, wherein the mineral-based material is limestone.

24. A printed package comprising mineral-based material, the package comprising:
- a first flat portion having printing thereon and at least one compacted region of increased stiffness;
- a second flat portion having a smooth appearance that is configured to display printing thereon in a manner that does not interfere with the smooth appearance and graphic presentation of the second flat portion and having an opening therein; and
- a central portion with a peripheral region positioned between the first and second flat portions and a cavity portion protruding from the opening;
- wherein the at least one compacted region partially overlaps an edge of the peripheral region of the central portion to secure the peripheral region of the central portion in place between the first flat portion and the second flat portion and wherein no portion of the at least one compacted region extends entirely through a vertical depth of the peripheral region of the central portion thereby providing a generally smooth appearance that is configured to display printing on the first flat portion in a manner that does not interfere with the generally smooth appearance and graphic presentation of the first flat portion, and
- wherein at least one of the first and second flat portions is composed of a mineral-based material.

25. The printed package of claim 24, wherein the mineral-based material comprises limestone.

26. The printed package of claim 24, wherein the first and second flat portions are composed of a mineral-based material.

27. The printed package of claim 24, wherein the first flat portion comprises fluted material.

28. The printed package of claim 27, wherein the fluted material comprises E-flute corrugated paperboard material.

29. The printed package of claim 24, wherein the at least one compacted region comprises a depression formed by deformation of the first flat portion towards the second flat portion due to stamping or heating.

30. The printed package of claim 24, wherein the central portion has a plurality of holes extending entirely through the peripheral region.

31. The printed package of claim 26, wherein the first and second flat portions are secured by direct contact made between the first and second flat portions through at least one of the plurality of holes.

32. The package of claim 26, wherein the central portion comprises preformed rigid or semi-rigid plastic.

* * * * *

UNITED STATES PATENT AND TRADEMARK OFFICE
CERTIFICATE OF CORRECTION

| | | |
|---|---|---|
| PATENT NO. | : 8,177,066 B2 | Page 1 of 1 |
| APPLICATION NO. | : 12/903156 | |
| DATED | : May 15, 2012 | |
| INVENTOR(S) | : Christopher R. Tilton | |

It is certified that error appears in the above-identified patent and that said Letters Patent is hereby corrected as shown below:

In the Specifications:

In Column 4 at Line 8 (approx.), after "package" insert --.--.

In Column 12 at Line 15, change "6can" to --6 can--.

In Column 19 at Line 44, change "and or" to --and/or--.

In Column 20 at Line 64, change "and or" to --and/or--.

In the Claims:

In Column 25 at Line 48, In Claim 1, after "region" insert --extends entirely through a vertical depth of the peripheral region--.

In Column 25 at Line 48, in Claim 1, change "portion thereby" to --portion, thereby--.

In Column 28 at Line 10 (approx.), in Claim 24, change "portion" to --portion,--.

Signed and Sealed this
First Day of January, 2013

David J. Kappos
*Director of the United States Patent and Trademark Office*